United States Patent [19]

Fujiwara

[11] Patent Number: 5,701,457
[45] Date of Patent: Dec. 23, 1997

[54] METHOD OF DESIGNATED TIME INTERVAL RESERVATION ACCESS PROCESS OF ONLINE UPDATING AND BACKING UP OF LARGE DATABASE VERSIONS WITHOUT RESERVING EXCLUSIVE CONTROL

[75] Inventor: Shinji Fujiwara, Yokohama, Japan

[73] Assignee: Hitachi, Ltd., Tokyo, Japan

[21] Appl. No.: 524,829

[22] Filed: Sep. 7, 1995

[30] Foreign Application Priority Data

Sep. 8, 1994 [JP] Japan ................. 6-240665

[51] Int. Cl.$^6$ ................. G06F 17/30
[52] U.S. Cl. ................. 395/608; 395/603; 395/617; 395/618; 395/619; 395/620
[58] Field of Search ................. 395/608, 603, 395/617, 618, 481, 200.02, 619

[56] References Cited

U.S. PATENT DOCUMENTS

| | | | |
|---|---|---|---|
| 4,648,036 | 3/1987 | Gallant | 395/619 |
| 4,821,175 | 4/1989 | Hikita et al. | 395/608 |
| 5,255,387 | 10/1993 | Arnold et al. | 395/617 |
| 5,280,612 | 1/1994 | Lorie et al. | 395/608 |
| 5,287,496 | 2/1994 | Chen et al. | 395/600 |
| 5,333,310 | 7/1994 | Sakai | 395/608 |
| 5,379,398 | 1/1995 | Cohn et al. | 395/481 |
| 5,471,580 | 11/1995 | Fujiwara et al. | 395/200.02 |
| 5,515,531 | 5/1996 | Fujiwara et al. | 395/603 |
| 5,592,660 | 1/1997 | Yokota et al. | 395/608 |

OTHER PUBLICATIONS

Ohmori et al. "Concurrency Control of Bulk Access Transactions on Shared Nothing Parallel Database Machineds", Data engineering, 1990 6th International conference, pp. 476–485, 1990.

Johnyoug et al. "Real-Time Transaction Processing: Pessimistic, Optomistic, and Hybrid Approaches", Research Issues in Data Engineering, 1992 Workshop, p. 222, 1992.

Rennhackkamp, MArtin "Performance Tuning", DBMS, v9, n11, p. 85(5), Oct. 1996.

Primary Examiner—Thomas G. Black
Assistant Examiner—Charles L. Rones
Attorney, Agent, or Firm—Antonelli, Terry, Stout & Kraus, LLP.

[57] ABSTRACT

An online database system executes an update or reference process for a plurality of records without stopping the online system by registering the update or reference process for reservation. By registering an update or reference process for a plurality of records for reservation beforehand, the reserved access process is executed at the designated reservation access time. The reservation update process is executed by a preliminary process for registering the process for reservation and a reservation update posterior process which is executed at the time of first access to the record after the reservation update time and the reservation reference process is executed by a preliminary process for registering the process for reservation, a posterior process which is executed after the reservation reference time, and a reservation reference backup process which is executed when an update process for said record which is generated after the reservation reference time and before the posterior process is executed.

9 Claims, 25 Drawing Sheets

FIG. 18

DB TABLE (ACCOUNT TABLE) 1801 1802

| ACCOUNT NUMBER | BALANCE | RESERVATION ACCESS TIME | ACCESS ID |
|---|---|---|---|
| 670190048 | 25,800 | 1992/06/10 9:00 | A0001 |
| 670190049 | 745,900 | 1992/06/10 9:00 | A0002 |
| 670191000 | 555,900 | 1992/06/10 7:00 | A0302 |
| 670191001 | 495,700 | 1992/06/10 7:00 | A0303 |

DB TABLE (BRANCH TABLE) 1803 1804

| BRANCH NUMBER | BALANCE AT BRANCH | RESERVATION ACCESS TIME | ACCESS ID |
|---|---|---|---|
| 670190 | 823,425,800 | | |
| 670191 | 1,255,745,900 | 1992/06/10 7:00 | A0301 |
| 670192 | 723,555,900 | | |
| | | | |

RESERVATION ACCESS TABLE 1805 1806 1807 1808

| ACCESS ID | RESERVATION INFORMATION | NEXT RESERVATION ACCESS TIME | NEXT ACCESS ID |
|---|---|---|---|
| A0001 | UPDATE:R0050:BALANCE+200,000 | | |
| A0002 | UPDATE:R0050:BALANCE+300,000 | 1992/06/10 12:00 | A0350 |
| A0301 | REFERENCE:R0119:B0001 | | |
| A0302 | REFERENCE:R0119:NULL | | |
| A0303 | REFERENCE:R0119:B0002 | | |
| A0350 | REFERENCE:R0120:NULL | | |

BACKUP TABLE 1810 1811

| BACKUP ID | BACKUP DATA |
|---|---|
| B0001 | 670191 ··· 1,255,775,900 |
| B0002 | 670191001 ··· 525,700 |

RESERVATION MANAGEMENT TABLE 1812 1813 1814 1815

| RESERVATION ID | RESERVATION STATE | RESERVATION ACCESS TIME | RESERVATION EXECUTION SENTENCE |
|---|---|---|---|
| R0119 | RESERVATION REFERENCE PRELIMINARY PROCESS COMPLETED | 1992/06/10 7:00 | SELECT... |
| R0120 | RESERVATION REFERENCE PRELIMINARY PROCESS STARTED | 1992/06/10 12:00 | SELECT... |

5,701,457

METHOD OF DESIGNATED TIME INTERVAL RESERVATION ACCESS PROCESS OF ONLINE UPDATING AND BACKING UP OF LARGE DATABASE VERSIONS WITHOUT RESERVING EXCLUSIVE CONTROL

BACKGROUND OF THE INVENTION

The present invention relates to a database system for executing batch updating and simultaneous reference to a plurality of records and particularly to a reservation access processing method in an online database processing system in which it is requested to execute access to a plurality of records without executing shared exclusive control for the plurality of records.

An online database system for holding bulk data such as an online system of a bank has been constructed due to development of an informationalized society. In an online database system, records of a table are frequently referred to and updated online.

Particularly, it is necessary to execute the large-scale batch process for updating and referring to a large amount of records such as getting statistical information of a bank account, updating an account balance on the basis of interest calculation, or backing up data while the online system is stopped so as to reserve the whole table of the database exclusively for a long time. However, recent demands for a large-capacity of database and prolongation of operating time of an online system are making it impossible to execute the aforementioned large-scale batch process while the system is stopped.

To solve those problems, a method for establishing consistency at suitable timing by duplicating a system and using one side for an online system and the other side for the large-scale batch process or a method for backing up data periodically and executing a large-scale batch process of a reference system such as generation of statistical information for backup data has been used conventionally. A version management system of a database for providing a function for accessing consistent data at a certain point of time in the past by managing a plurality of data versions has been proposed.

Particularly, for a database version management system, various methods have been proposed. For example, U.S. Pat. No. 5,287,496 discloses a method for executing the transaction process and the reference access process efficiently in parallel without the two interfering with each other. Namely, in this prior art, finite logical versions are held on each page of a database, and they are managed by a time stamp, and information indicating a table for managing the transaction which is carried out at present and the system status is stored, so that for query access to the table with the transaction carried out, access to a database of a newer version is made possible without stopping the transaction. This database version management system is an art valid in executing the transaction process accompanied by data update and the reference batch process for referring to a large amount of data in parallel.

As mentioned above, in a conventional online system, to execute the large-scale batch process, a method for stopping the system, duplicating the system, backing up data, or providing a plurality of data versions is used. However, the method for stopping the online system and executing the process during stopping causes a big problem that 24-hour continuous running of the system is made impossible.

The method for duplicating a system and using one side for an online system and the other side for large-scale batch processing is difficult to guarantee the consistency of each data and cannot be applied to a case that data which is being updated successively online is to be referred to directly. There is a problem imposed that the processing result of an update system executed by a large-scale batch processing system cannot be read on the online system side if it is not after the consistency of data between the online system and the large-scale batch processing system is established.

Furthermore, the method for executing the large-scale batch process utilizing the backup of data causes a problem that it is necessary to exclusively control a table for the backup process because the data backup process itself is a large-scale reference system batch process.

The method for managing versions of the database is valid in executing the transaction process and the reference system batch process in parallel but causes a problem that it cannot execute the transaction process and the update system batch process in parallel and as to the reference system batch process, it can access a newer database but cannot get accurate statistical information at a certain time.

Furthermore, another problem is imposed that the method always holds a plurality of versions of the database, so that a large capacity storage is necessary.

SUMMARY OF THE INVENTION

An object of the present invention is to provide a method for executing updating and referring to a large amount of records by exclusive control for each record without reserving exclusive control for the records at the same time.

Another object of the present invention is to provide a function for showing a user of a database as if a large amount of records are logically updated simultaneously at the designated time.

Still another object of the present invention is to provide a function for realizing referring to a large amount of records at the designated time only by backup of a minimum amount of data.

A further object of the present invention is to provide a function for registering a plurality of reservation accesses to a record.

A still further object of the present invention is to provide a function for canceling a whole reservation access process when the reservation access process fails.

The reservation access processing method relating to the present invention provides a method for reserving an updating of a plurality of records beforehand and logically executing the reserved updatings simultaneously at the designated reservation update time. This reservation update process is executed by a reservation update preliminary process for registering updating of the corresponding record for reservation and a reservation update posterior process to be executed at the time of first access to the corresponding record after the reservation update time. The reservation update preliminary process stores the reservation update time and update content of the record in the reservation update information comprising the reservation update time having a one-to-one correspondence with each record in the aforementioned database table and the reservation information. When the reservation update preliminary process accesses a record in the database, it checks whether there is reservation update registration of the record or not and compares the current time with the reservation update time. When there is reservation update registration corresponding to the record and the current time is after the reservation update time, the reservation update preliminary process executes the reservation update posterior process and then executes the access process for the record. When there is no reservation update registration or the current time is before the reservation update time, the reservation update preliminary process does not execute the reserved update but executes the access process for the record. The reservation update posterior process executes the update registered in the record and deletes the reservation update registration.

After the reservation update time, a cleaning-up process for executing the reservation update posterior process step for all the records which are reserved for updating may be executed. If the current time passes the reservation update time of reservation update registration when the reservation update registration is being executed at the reservation update preliminary process step, the state of the reservation update process is set to the state of reservation update preliminary process cancelled and the reservation update information of all the records which are registered for reservation update is deleted. When the reservation update posterior process step is executed, the state of the reservation update process is confirmed. When the state is reservation update preliminary process cancelled, the reservation update registration is discarded. It is desirable to manage the state of the reservation update process, for example, by providing a table for managing the reservation access state.

Furthermore, the reservation access processing method relating to the present invention provides a method for reserving reference to a plurality of records beforehand and executing reference to all the records at the reservation reference time without reserving the shared exclusive access right of the plurality of records at the same time. The reservation reference process is executed by a reservation reference preliminary process for registering reference to the corresponding record for reservation, a reservation reference posterior process to be executed after the reservation reference time, and a reservation reference backup process to be executed when an update process for the reference record which is generated after the reservation reference time and before the reservation reference posterior process is executed. The reservation reference preliminary process stores the reservation reference time and reference content of the corresponding record in the reservation update information comprising the reservation reference time having a one-to-one correspondence with each record in the aforementioned database table and the reservation information. When the reservation update preliminary process accesses a record in the database for updating, it checks whether there is reservation update registration of the record or not and compares the current time with the reservation update time. When there is reservation reference registration corresponding to the record and the current time is after the reservation reference time, the reservation update preliminary process executes the reservation reference backup process, creates a backup of the data of the record, and then executes the update access process for the record. When there is no reservation reference registration or the current time is before the reservation reference time, the reservation update preliminary process does not execute the reservation reference backup process but executes the update access process for the record. When backup data of the record is created, the reservation reference posterior process which is started by an interruption of the timer after the reservation reference time refers to the backup data and then deletes the backup data and the reservation reference registration. When no backup data exists, the reservation reference posterior process directly refers to the content of the record and then deletes the reservation reference registration.

If the current time passes the reservation reference time of reservation reference registration when the reservation reference registration is being executed at the reservation reference preliminary process step, the state of the reservation reference process is set to the state of reservation reference preliminary process cancelled and the reservation reference information of all the records which are registered for reservation reference is deleted. When the reservation reference backup process step and the reservation reference posterior process step are executed, the state of the reservation reference process is confirmed. When the state is reservation reference preliminary process cancelled, the reservation reference registration is discarded. It is desirable to manage the state of the reservation reference process, for example, by providing a table for managing the reservation access state.

Furthermore, it is possible to provide a pointer to the next reservation update information or reservation reference information in the reservation update information or reservation reference information to be stored in the aforementioned reservation update registration or the aforementioned reservation reference registration and register a plurality of reservation accesses for a record. In the reservation update preliminary process and reservation update posterior process in the reservation update process of the present invention, only the exclusive control process relating to a record in process at present may be executed but there is no need to execute exclusive control for all the records to be updated at the same time. As a result, a large amount of records can be updated only by locking each record.

The update process for a record which is registered for reservation update is executed at the time of access processing for the first corresponding record after the reservation update time, so that the database is not updated actually at the reservation update time. Therefore, it is possible to show a user as if the update process is executed instantaneously for all the records.

On the other hand, in the reservation reference preliminary process, reservation reference backup process, and reservation reference posterior process in the reservation reference process of the present invention, only the exclusive control process relating to a record in process at present may be executed but there is no need to execute exclusive control for all the records to be referred to at the same time. As a result, a large amount of records can be updated only by locking each record.

The reference process for a record which is referred to for reservation is executed by the reservation reference posterior process which is started by an interruption of the timer after the reservation reference time. The database is not referred to actually at the reservation reference time, so that it is possible to show a user as if the reference process is executed instantaneously for all the records.

Backing up of a record which is registered for reservation reference is executed only when the update process is executed for the record after the designated reservation reference time before the reservation reference posterior process is not executed for the record. Therefore, it is made possible to minimize the backup necessary to realize reference to consistent data. Furthermore, these backup data are deleted when the reservation reference posterior process is executed, so that the overhead of the database capacity of the whole system can be reduced.

Furthermore, the present invention allows registration of a plurality of reservation accesses for a record, so that this function can be provided for various systems.

The present invention can provide a function for canceling a reservation access process when the reservation access preliminary process is not completed before the reservation access time by providing a table for managing the state of reservation access.

BRIEF DESCRIPTION OF THE DRAWINGS

FIG. 18 is a table structural diagram in the fourth embodiment of the present invention.

DESCRIPTION OF THE PREFERRED EMBODIMENTS

The embodiments of the present invention will be explained hereunder with reference to the accompanying drawings.

Figure 23:
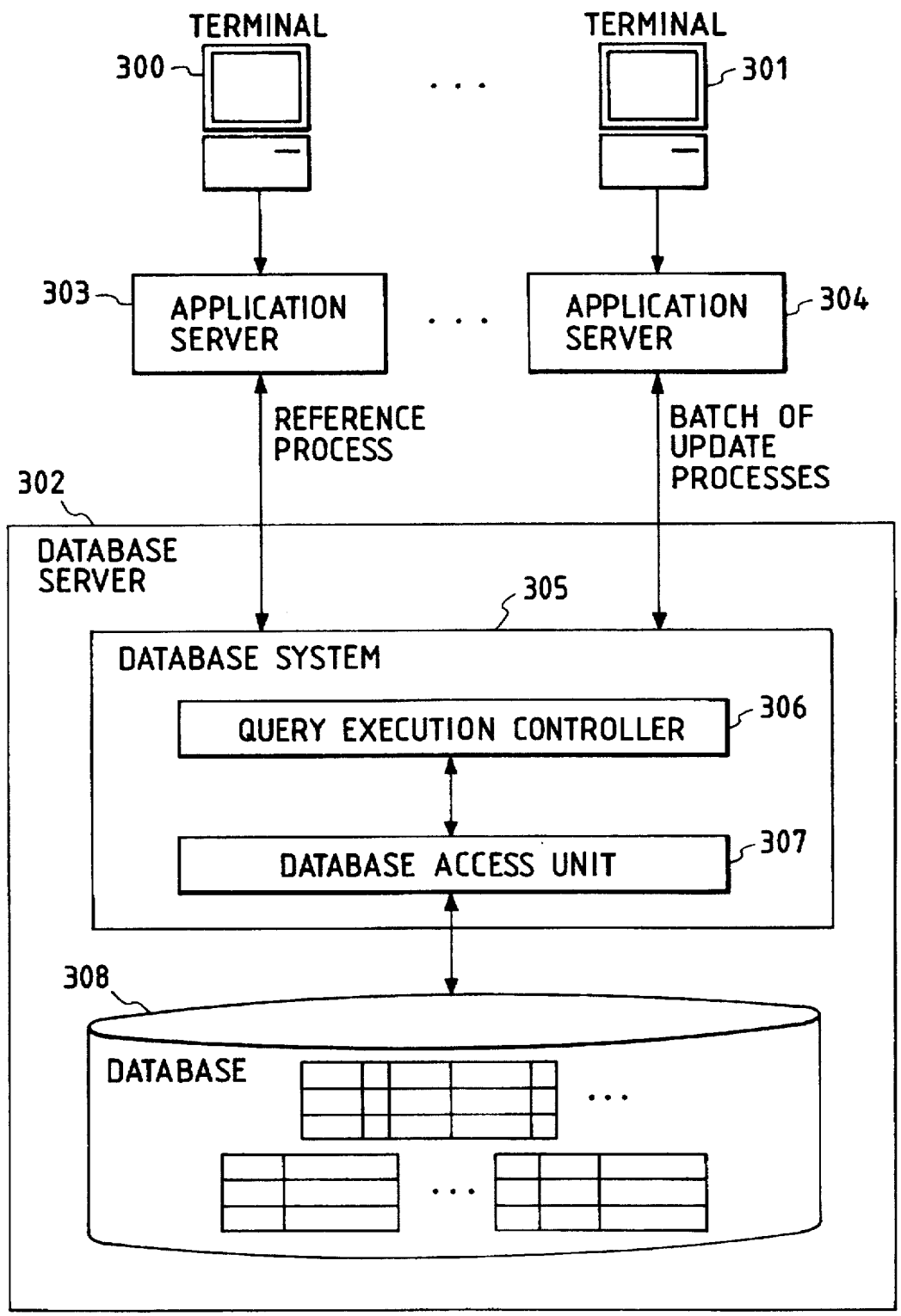
FIG. 23 is a drawing showing the constitution of the database system of the present invention.

FIG. 23 is a drawing showing the constitution of the database system executing the present invention. The system comprises a plurality of terminals 300 and 301 for accessing a database, one or more application servers 303 and 304 for accessing the database, and a database server 302 for supporting the database. The database server 302 comprises a database system 305 and a database 308. The database system 305 comprises a query execution controller 306 for controlling execution of the query process such as SQL (structured query language) issued from an application program and a database access unit 307 for accessing the database. The drawing is a drawing in which the database server 302 and the application servers 303 and 304 are mounted on different processors. However, the application servers and the database server may be mounted on the same processor. The database system may be not only a general database system which is operated by a single processor but also a parallel database system which is operated on a plurality of processors.

Now, the terminal 301 attempts to update the tables of the database in a batch and the terminal 300 attempts to refer to the tables. It will be explained hereunder by referring to a concrete example. The situation is such that the application server 304 is a salary transfer program, and the application server 303 is a balance query program, and the terminal 301 attempts to transfer a salary to an employee account, and a person attempts to query the balance of his own account from the terminal 300. The present invention provides a means for eliminating a variation in the update time of the database by designating the time of batch of update processes in such a situation and referring to consistent data. The new database accessing method of the present invention is mounted in the query execution controller 306 and the database access unit 307 in the database system shown in FIG. 23. The new database accessing method will be explained in the following description according to each embodiment.

Embodiment 1

In Embodiment 1, a method for providing a reservation update process for a database will be explained.

Figure 1A:
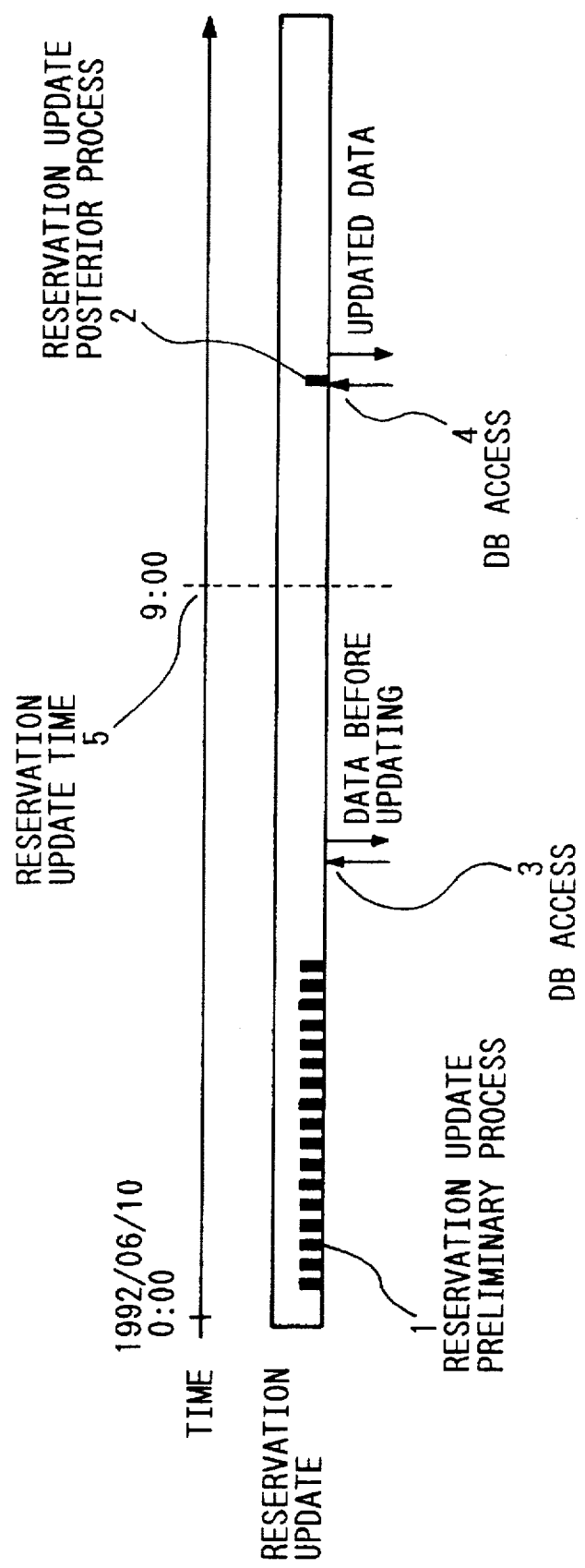
FIG. 1(a) is a diagram for explaining the outline of the reservation update process in a first embodiment of the present invention.

FIG. 1(a) is a diagram for explaining the outline of the reservation update process in this embodiment.

The abscissa indicates flow of the time and each black quadrangle indicates a process which is executed at each time. The reservation update process is realized by two processes such as a reservation update preliminary process (1) for registering update of records for reservation and a reservation update posterior process (2) which is executed after the reservation update time (5).

When the reservation update process accesses a record for which the reservation update preliminary process (1) is completed before the reservation update time (5), it provides the data before updating (3) and when the reservation update process accesses the record after the update time (5), it executes the reservation update posterior process (2), executes the reserved update process, and then provides the updated data (4).

By delaying updating of a record until the first access after the update time like this, it is possible to show logically as if the update process of the record is not executed at the reservation update time (5) but all the records are updated at the reservation update time simultaneously.

Figure 1B:
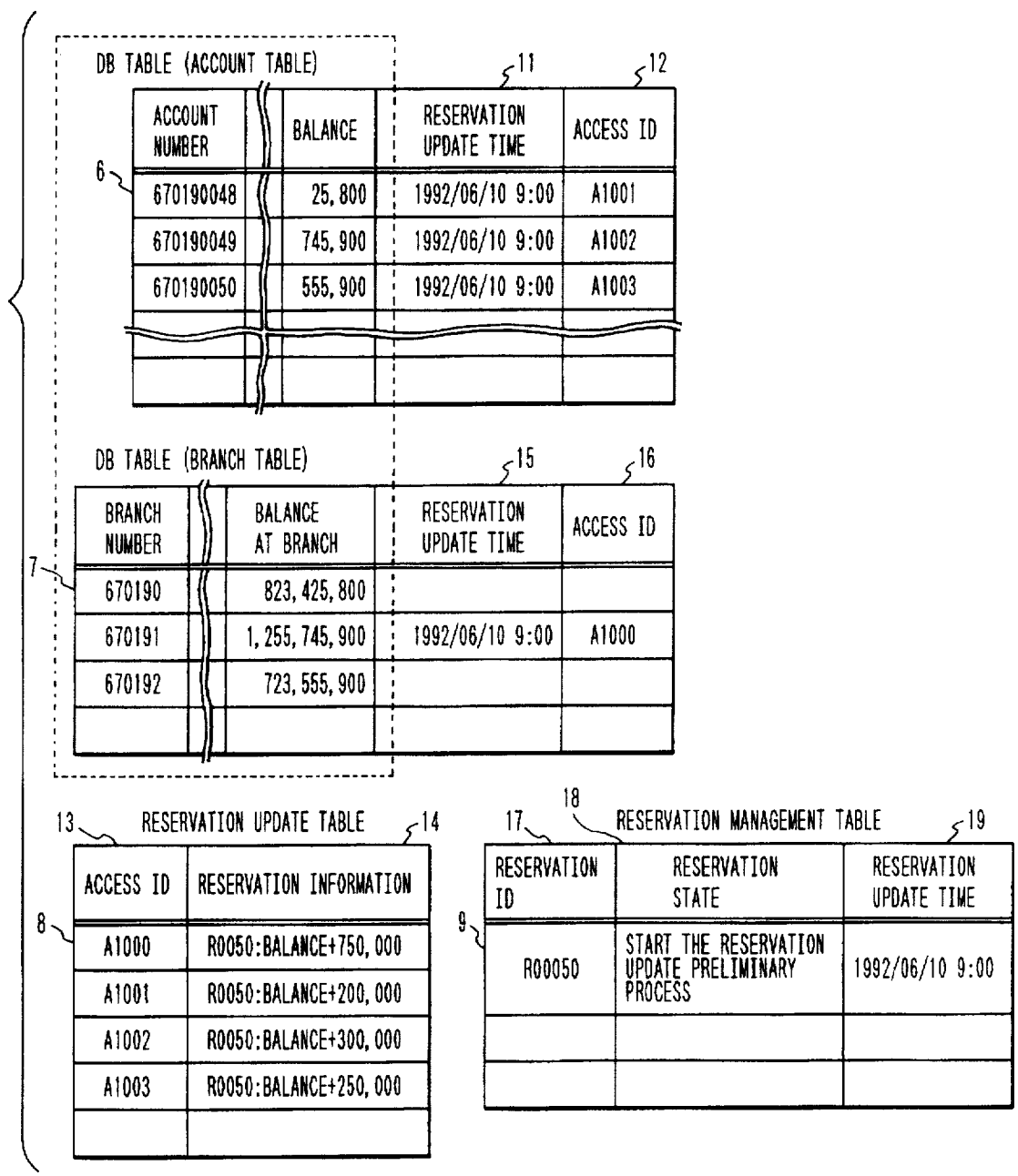
FIG. 1(b) shows a schematic view of the processing and a table structural diagram in the first embodiment of the present invention.

FIG. 1(b) is a drawing showing the table structure for realizing the reservation update process. An account table (6) and a branch table (7) are database tables (DB tables) created by an application program and a reservation update table (8) and a reservation management table (9) are tables created by a database system so as to realize the reservation update process.

Among the DB tables created by the application program, the application program can directly access only the portion (10) enclosed by a dashed line. The columns of reservation update time (11 and 15) and the columns of access ID (12 and 16) are added by the database system so as to realize the reservation update process. The reservation update time of each record is stored in the columns of reservation update time (11 and 15) among the columns added to the DB tables. When nothing is stored in the columns of reservation update time (11 and 15), it indicates that no update reservation process is registered for the record. In the columns of access ID (12 and 16), identifiers used to access the reservation update table (8) are stored.

One reservation update table (8) exists in the database system and comprises an access ID (13) and reservation information (14). The access ID (13) is a unique identifier in the reservation update table (8) and establishes a correspondence between the DB tables (6 and 7) and the reservation update table (8). In the column of reservation information (14), the reservation ID of a reserved update process and the update process content are described.

One reservation management table (9) exists in the database system and comprises a reservation ID (17), a reservation state (18), and a reservation update time (19). The reservation ID (17) is a number assigned to a reservation update process to be executed logically at the same time and a unique number in the database system. The reservation state (18) indicates the processing state of the aforementioned reservation update process to be executed at the same time. "Start the reservation update preliminary process" and "reservation update preliminary process cancelled" are processing states. "Start the reservation update preliminary process" indicates that the preliminary process of the reservation update is being executed and "reservation update preliminary process cancelled" indicates that the registered reservation update information is being cancelled because the preliminary process of the reservation update does not end before the reservation time. On the other hand, the column of reservation update time (19) stores the time for executing reservation update.

The reservation update shown in this embodiment is that the reservation ID (17) is R0050, and the update time (19) is 1992/06/10/9:00, and the reservation update preliminary process is being executed at present, and the reserved update contents are that 200,000 is added to the balance of the record of the account number 670190048 in the account table (6) and 300,000 is added to the balance of the record of the account number 670190049.

In the table structure shown in this embodiment, identifiers are used so as to establish a correspondence between the DB tables (6 and 7) and the reservation update table (8) and a correspondence between the reservation update table (8) and the reservation management table (9). Needless to say, pointers may be used to establish those correspondences.

Figure 2:
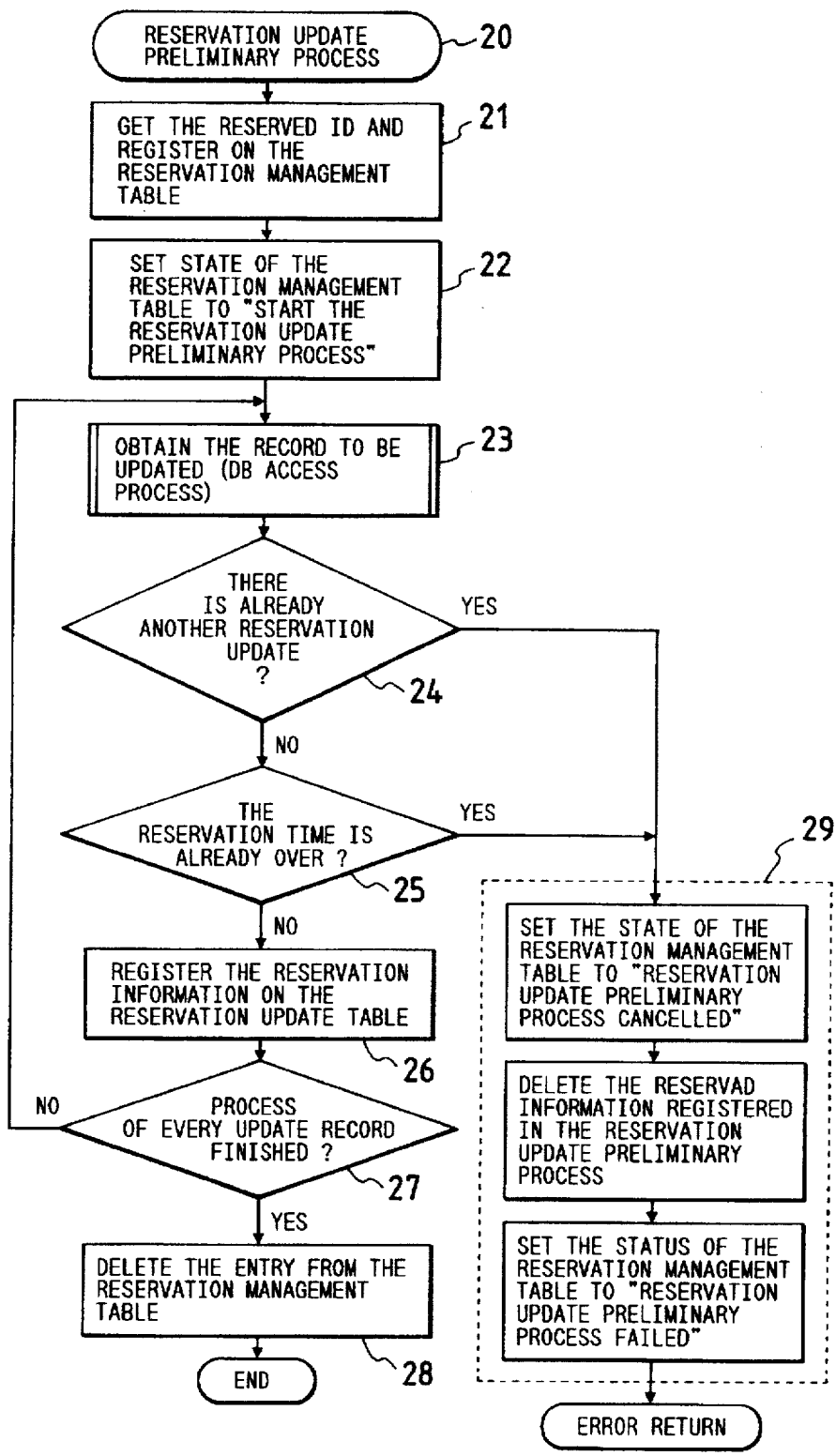
FIG. 2 is a flow chart of the reservation update preliminary process in the first embodiment of the present invention.

FIG. 2 is a drawing showing the flow of the reservation update preliminary process in this embodiment. The reservation update preliminary process (20) gets the reserved ID first and registers the reserved ID and reservation time in the reservation management table (9) (Step 21). The reserved ID is a unique identifier in the database system. Next, the reservation update preliminary process (20) sets the reservation state in the reservation management table (9) to "start the reservation update preliminary process" (Step 22) and executes the following process for every update record.

Firstly, the reservation update preliminary process (20) obtains the content of the record to be updated by a database access process (DB access process) which will be described later (Step 23). Next, the reservation update preliminary process (20) confirms the field of reservation update time (11 or 15) of the record and decides whether another reservation update is already registered or not (Step 24). When another reservation update is already registered, the reservation update preliminary process (20) passes control to the error process (Step 29). When another reservation update is not registered, the reservation update preliminary process (20) checks whether the reservation time of the reservation update process which is being registered is already over or not (Step 25). When the reservation time is over, the reservation update preliminary process (20) passes control to the error process (Step 29) assuming that the reservation update preliminary process does not end before the appointed time.

When the reservation time is not over at Step 25, the reservation update preliminary process (20) registers the reservation information on the reservation update table (8) (Step 26) and goes to the process of the next updated record (Step 27). When the registration of reservation information of every updated record is completed (Step 27), the reservation update preliminary process (20) deletes the entry corresponding to this reservation update from the reservation management table (9) (Step 28) and ends the processing.

On the other hand, when an error occurs during registration of reservation information of each record, the reservation update preliminary process (20) sets the state in the reservation management table (9) to "reservation update preliminary process cancelled" first, deletes all the reservation informations registered by the reservation update preliminary process from the table, sets the state in the reservation management table (9) to "reservation update preliminary process failed" finally, and takes the step of error return (Step 29).

Figure 3:
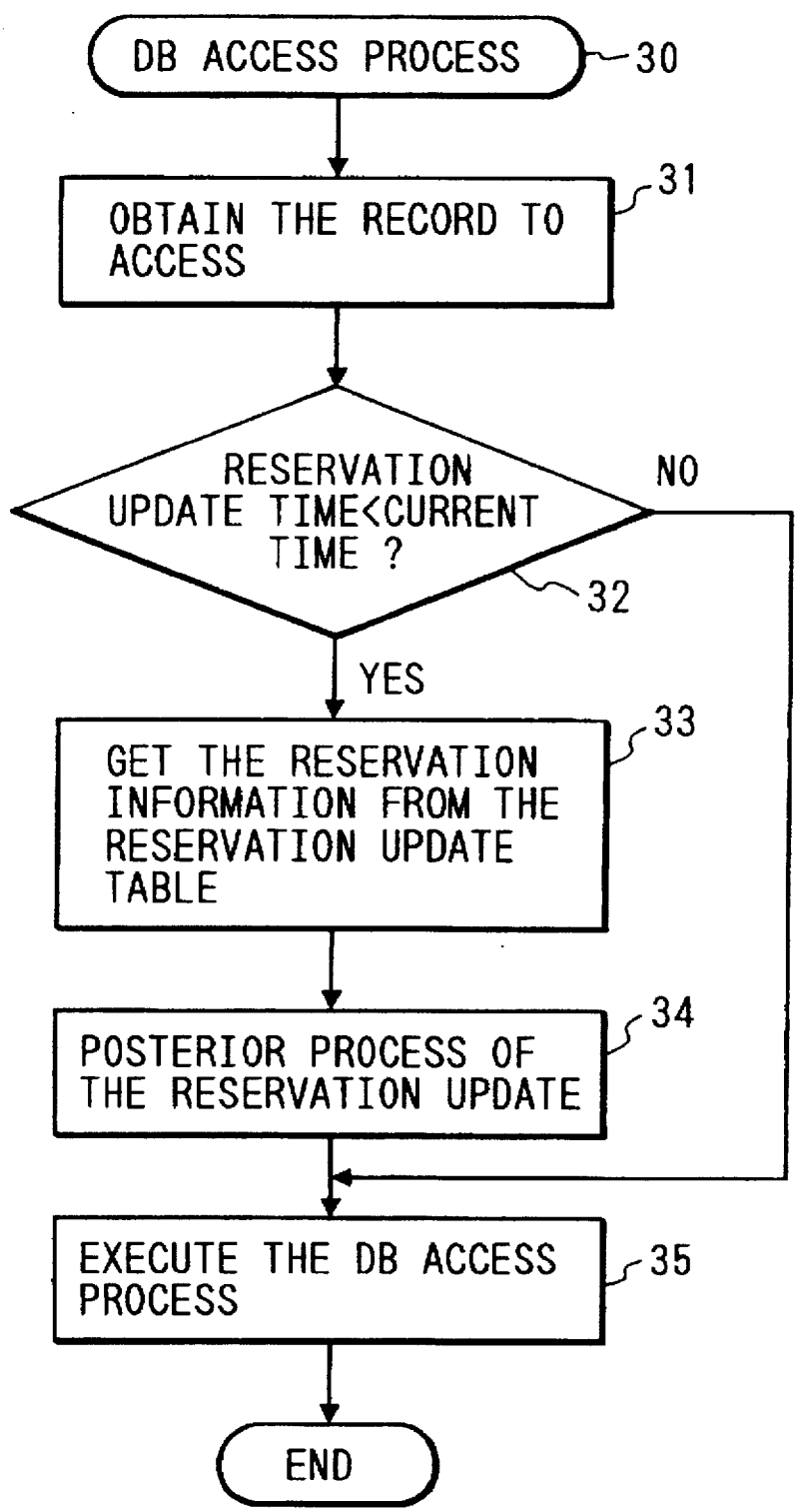
FIG. 3 is a flow chart of the database access process in the first embodiment of the present invention.

FIG. 3 is a drawing showing the flow of the database access process (DB access process) in this embodiment. The DB access process includes both of a record reference process and a record update process.

The DB access process (30) obtains the record to access from the DB table (6 or 7) first (Step 31) and decides whether the reservation update time (11 or 15) of the record is registered and the current time passes the reservation update time or not (Step 32). When the current time passes the reservation update time, the database access process (30) gets the reservation information (14) from the reservation update table (8) using the access ID of the record as a key (Step 33), executes a reservation update posterior process which will be described later on the basis of the reservation information (14) (Step 34), and then executes the DB access process of the record (Step 35).

When the reservation update time of the record to access is not registered or the reservation update time of the record is not over at Step 32, the database access process (30) does not execute the reservation update posterior process but executes the DB access process for the current record (Step 35).

Figure 4:
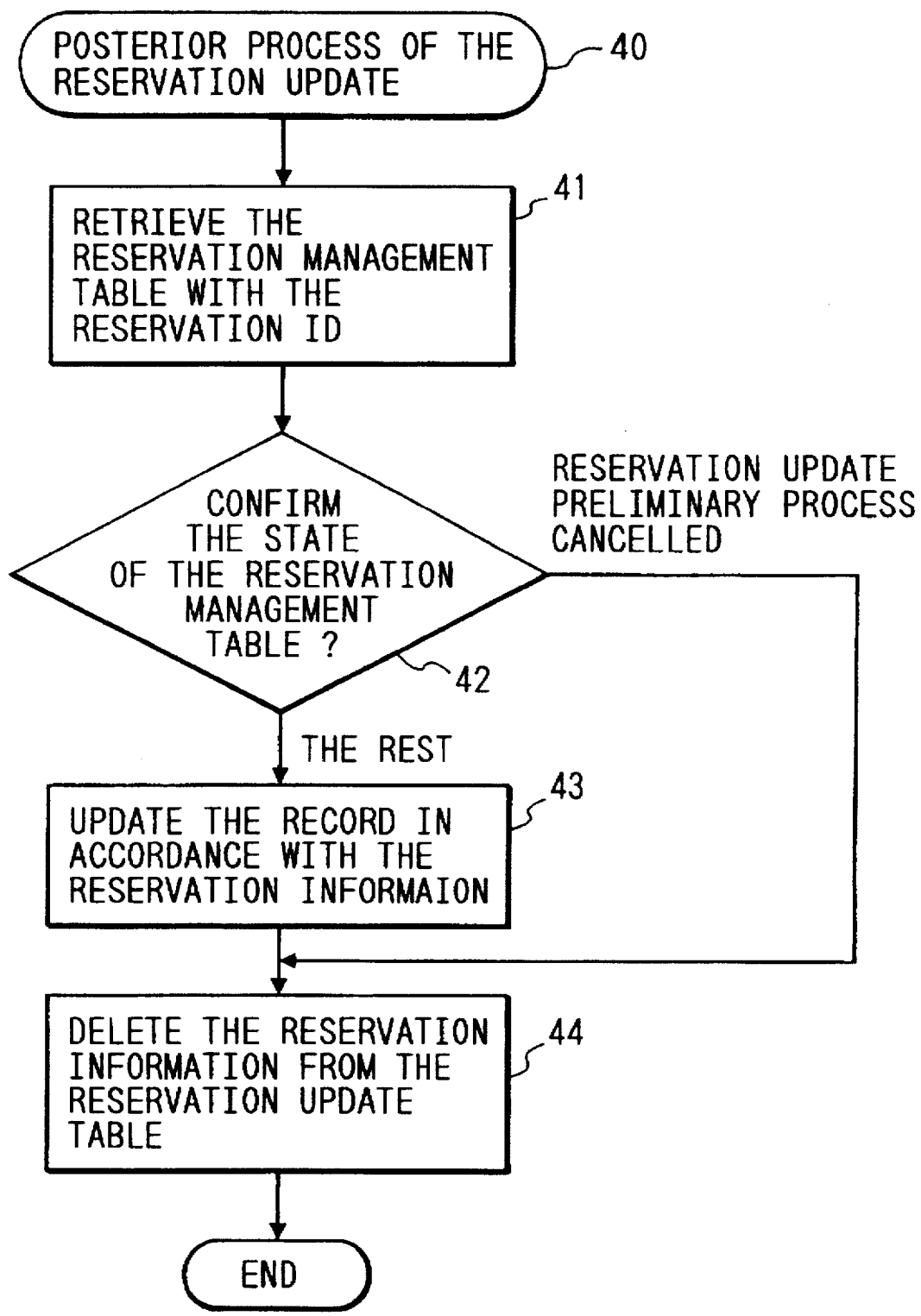
FIG. 4 is a flow chart of the reservation update posterior process in the first embodiment of the present invention.

FIG. 4 is a drawing showing the flow of the reservation update posterior process in this embodiment. The reservation update posterior process (40) retrieves the reservation management table (9) with the reservation ID (Step 41) first and confirms the state (18) of the reservation management table (9) (Step 42). When the state (18) of the reservation management table (9) is other than "reservation update preliminary process cancelled", the reservation update posterior process (40) updates the record in accordance with the reservation information (14) (Step 43) and then deletes the reservation information (14) from the reservation update table (8) (Step 44). When the state (18) of the reservation management table (9) is "reservation update preliminary process cancelled" (Step 42), the reservation update posterior process (40) does not update the record but deletes the reservation information (14) from the reservation update table (8) (Step 44) and ends the reservation update posterior process.

In this embodiment, a record which is updated for reservation will not be updated unless DB access is caused to the record after the reservation update time. However, since a periodic backup operation is executed in an ordinary database system, DB access is generated during this backup operation and the reservation update posterior process is executed for this record. In a system which is not backed up, a cleanup process for accessing all the databases is executed at fixed intervals of time so as to finish the reservation update process, so that the reservation update posterior process can be executed.

This embodiment is characterized in that a reservation update time field is provided in the DB table and a process for deciding whether or not to execute reservation update from the relationship between the reservation update time and the current time at the time of DB access processing is provided. By doing this, a function for logically showing as if all the records are updated at the same time at the reservation update time can be provided from an application program without accessing the database at the reservation update time.

Since all the processes can be realized by using the exclusive control for each record in the table, a large amount of records can be updated in a batch even when the system is in operation. It is also one of the characteristics of this embodiment that the present invention has a means for canceling the reservation update information when the reservation time is over before the reservation update preliminary process is completed.

It is obvious that this embodiment can be applied to every database of not only a relational type database system but also a structural type or hierarchical type database system which is accessed in record units.

Embodiment 2

Next, the second embodiment of the present invention will be explained. In this second embodiment, a method for providing a reservation reference process for a database will be explained.

Figure 5A:
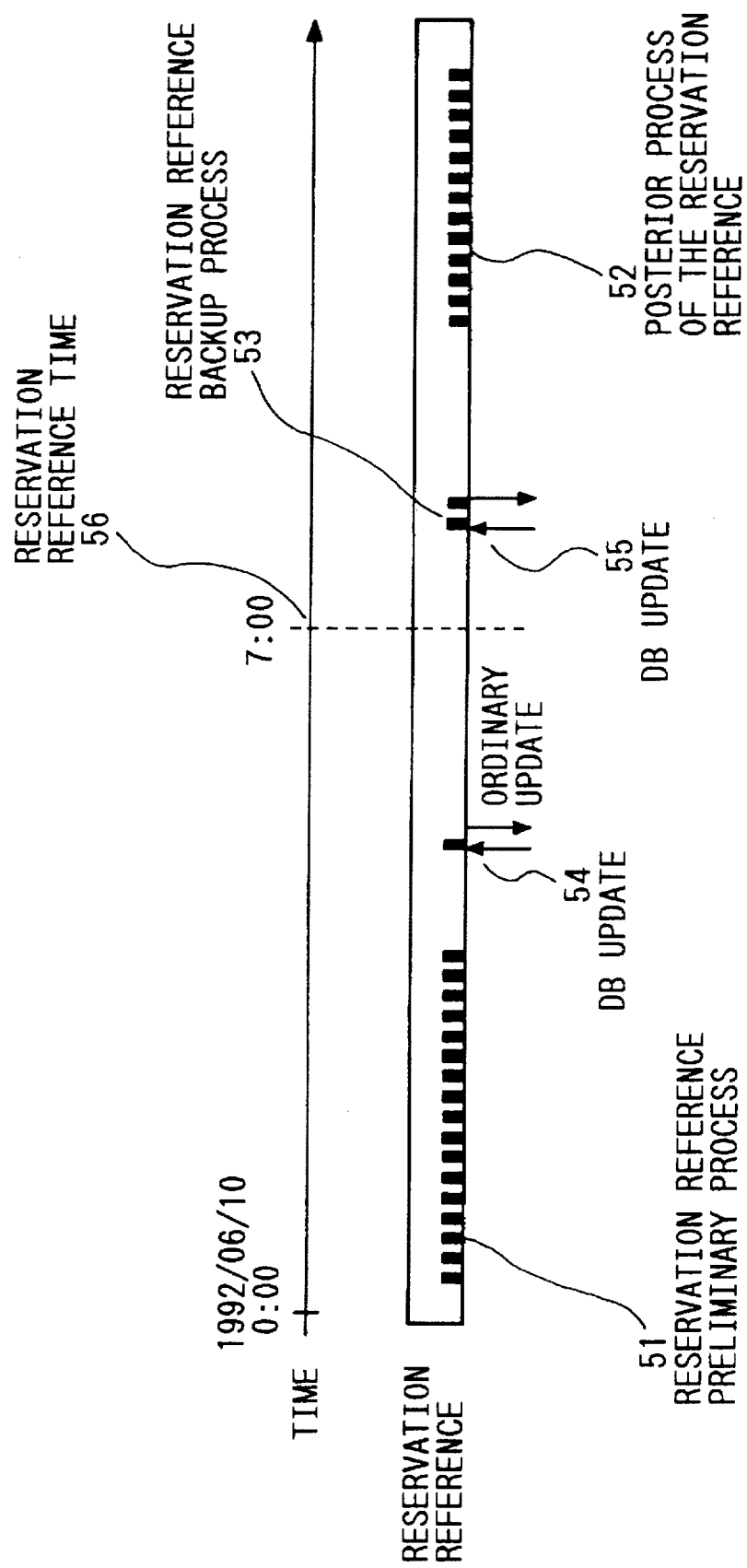
FIG. 5(a) is a diagram for explaining the outline of the reservation reference process in a second embodiment of the present invention.

FIG. 5(a) is a diagram for explaining the outline of the reservation reference process in this embodiment. The abscissa indicates flow of the time and each black quadrangle indicates a process which is executed at each time. The reservation reference process is realized by three processes such as a reservation reference preliminary process (51) for registering reference of records for reservation, a reservation reference posterior process (52) which is executed after the reservation reference time (56), and a reservation reference backup process (53) which is executed at the time of a DB update process generated after the reference time (56) and before the reservation reference posterior process (52).

When the reservation reference process accesses a record for which the reservation reference preliminary process (51) is completed before the reservation reference time (5), it executes the update process as usual (54). When the reservation reference process executes the update process for the record after the reference time (56) and before the reservation reference posterior process (52), it executes the reservation reference backup process (53), creates a backup of the record which is referred to for reservation, and executes the update process for the record (55).

When a backup of the reference record is created, the reservation reference posterior process (52) refers to the backup data. When there is no backup, the reservation reference posterior process (52) refers to the data of the record. The reservation reference posterior process (52) executes at a suitable timing after the reservation reference time (56). The timing for starting the reservation reference posterior process (52) can be realized by various methods such as starting it by a timer after the reference time (56) or at the time of first occurrence of DB access after the reference time (56).

In this embodiment, by creating backup copies only for records which are updated before the reservation reference posterior process, it is possible to logically show as if the record reference process is not executed at the reservation reference time (56) and the reference to all the records is executed at the same time at the reservation reference time.

Figure 5B:
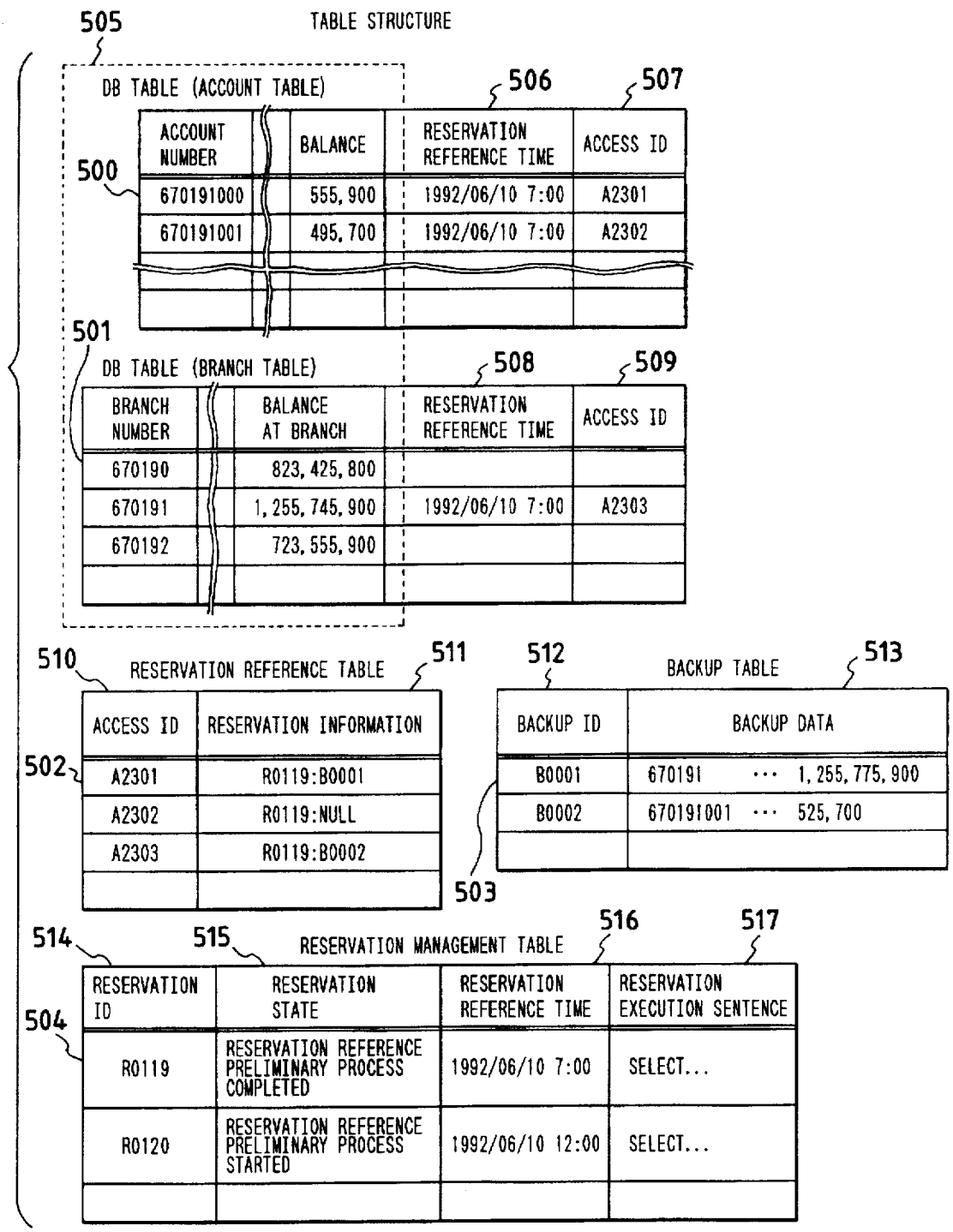
FIG. 5 (b) shows a schematic view of the processing and a table structural diagram in the second embodiment of the present invention.

FIG. 5(b) is a drawing showing the table structure for realizing the reservation reference process. An account table (500) and a branch table (501) are database tables (DB tables) created by an application program and a reservation reference table (502), a backup table (503), and a reservation management table (504) are tables created by a database system so as to realize the reservation reference process.

Among the DB tables created by the application program, the application program can directly access only the portion (505) enclosed by a dashed line. The columns of reservation reference time (506 and 508) and the columns of access ID (507 and 509) are added by the database system so as to realize the reservation reference process. The reservation reference time of each record is stored in the columns of reservation reference time (506 and 508) among the columns added to the DB tables. When nothing is stored in the columns of reservation reference time (506 and 508), it indicates that no reference reservation process is registered for the record. In the columns of access ID (507 and 509), identifiers used to access the reservation reference table (502) are stored.

One reservation reference table (502) exists in the database system and comprises an access ID (510) and reservation information (511). The access ID (510) is a unique identifier in the reservation reference table (502) and establishes a correspondence between the DB tables (500 and 501) and the reservation reference table (502). In the column of reservation information (511), the reservation identifier of a reserved reference process and the backup identifier are described. The backup identifier (ID) indicates the backup ID when a backup exists and establishes a correspondence between the entries of the reservation reference table (502)

and the entries of the backup table (503). When the backup ID in the reservation information (511) is a null value (initial value), it indicates that the record is not backed up.

One backup table (503) exists in the database system and comprises a backup ID (512) and backup data (513). The backup ID (512) is a unique identifier in the backup table (503). In the column of backup data (513), the backup of a record to be updated after the reservation reference time (backup of a record before updating) is stored. In this embodiment, the backup is stored in record units. However, needless to say, it is also possible to create a backup of only a field to be referred to.

One reservation management table (504) exists in the database system and comprises a reservation ID (514), a reservation state (515), a reservation reference time (516), and a reservation execution sentence (517). The reservation ID (514) is a number assigned to a reservation reference process to be executed logically at the same time and a unique number in the database system. The reservation state (515) indicates the processing state of the aforementioned reservation reference process to be executed at the same time. "Start the reservation reference preliminary process", "reservation reference preliminary process completed", and "reservation reference preliminary process cancelled" are processing states. "Start the reservation reference preliminary process" indicates that the preliminary process of the reservation reference is being executed, and "reservation reference preliminary process completed" indicates that the preliminary process of the reservation reference terminates normally, and "reservation reference preliminary process cancelled" indicates that the registered reservation reference information is being cancelled because the preliminary process of the reservation reference does not end before the reservation time. On the other hand, the time for executing reservation reference is stored in the column of reservation reference time (516) and the reserved reference execution sentence (query execution sentence or query execution code) is stored in the column of reservation execution sentence.

The reservation reference shown in this embodiment is that the reservation ID (514) is R0119, and the reference time (516) is 1992/06/10/7:00, and the reservation reference preliminary process is completed at present, and a record of the account number 670191000 and a record of 670191001 in the account table (500) and a record of the branch number 670191 in the branch table (501) are registered for reservation reference. Since the records of the account number 670191000 in the account table (500) and the branch number 670191 in the branch table (501) are updated after the reservation reference time, the contents of the records at the point of reservation reference time are stored in the backup table (503).

In the table structure shown in this embodiment, identifiers are used so as to establish a correspondence between the DB tables and the reservation reference table, a correspondence between the reservation reference table and the reservation management table, and a correspondence between the reservation reference table and the backup table. Needless to say, pointers may be used to establish those correspondences.

Figure 6:
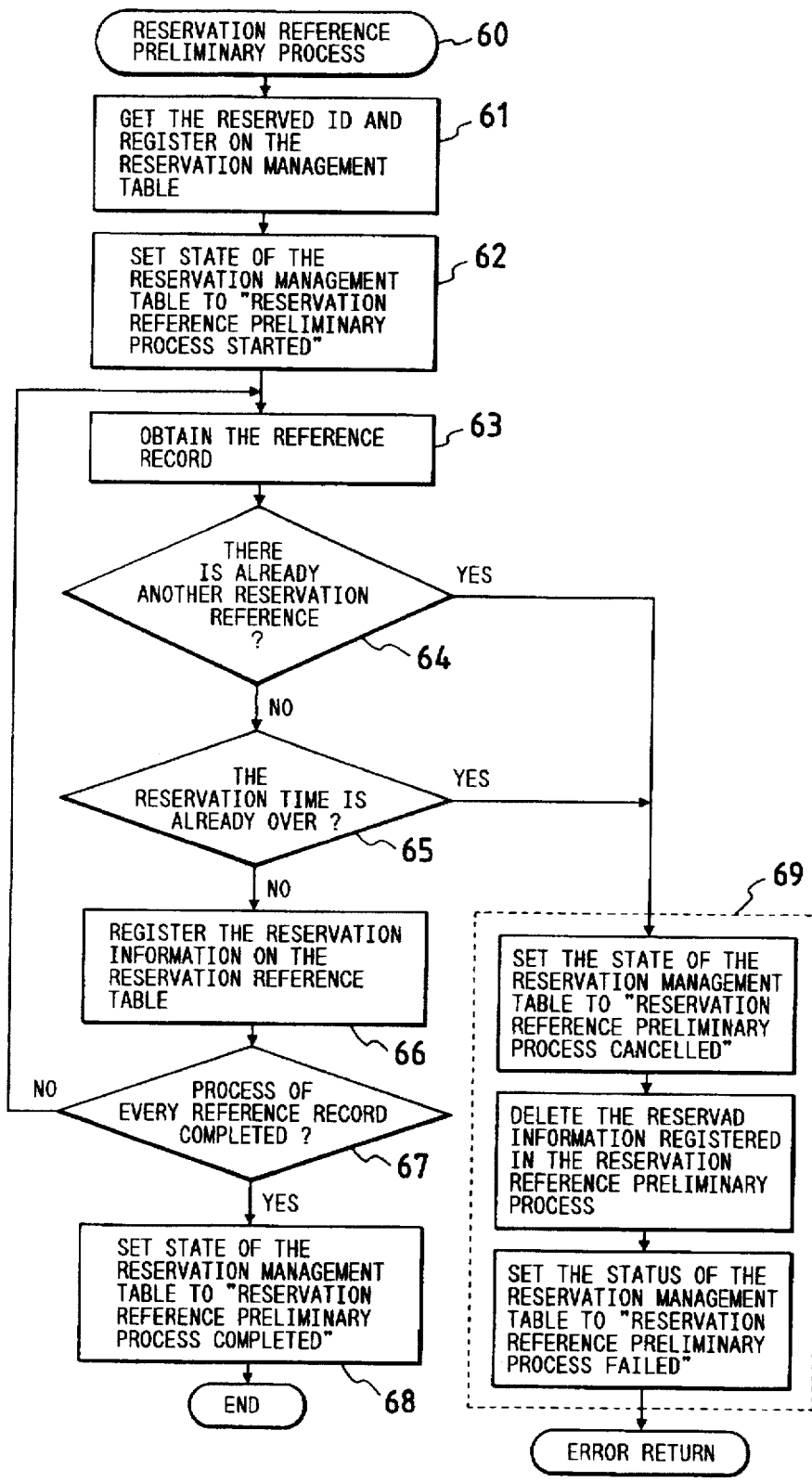
FIG. 6 is a flow chart of the reservation reference preliminary process in the second embodiment of the present invention.

FIG. 6 is a drawing showing the flow of the reservation reference preliminary process in this embodiment. The reservation reference preliminary process (60) gets the reserved ID first and registers the reserved ID, reservation time, and reservation execution sentence in the reservation management table (504) (Step 61). Next, the reservation reference preliminary process (60) sets the reservation state in the reservation management table (504) to "start the reservation reference preliminary process" (Step 62) and executes the following process for every reference record.

Firstly, the reservation reference preliminary process (60) obtains the content of the record to be referred to (Step 63). Next, the reservation reference preliminary process (60) confirms the field of reservation reference time (506 or 508) of the record and decides whether another reservation reference is already registered or not (Step 64). When another reservation reference is already registered, the reservation reference preliminary process (60) passes control to the error process (Step 69). When another reservation reference is not registered, the reservation reference preliminary process (60) checks whether the reservation time of the reservation reference process which is being registered is already over or not (Step 65). When the reservation time is over, the reservation reference preliminary process (60) passes control to the error process (Step 69) assuming that the reservation reference preliminary process does not end before the appointed time.

When the reservation time is not over at Step 65, the reservation reference preliminary process (60) registers the reservation information on the reservation reference table (502) (Step 66) and goes to the process of the next reference record (Step 67). The backup ID in the reservation information (511) is initialized to a null value (there is no backup data).

When the registration of reservation information of every reference record is completed (Step 67), the reservation reference preliminary process (60) sets the reservation state (515) in the reservation management table (504) to "reservation reference preliminary process completed" (Step 68) and ends the processing.

On the other hand, when an error occurs during registration of reservation information of each record, the reservation reference preliminary process (60) sets the state in the reservation management table (504) to "reservation reference preliminary process cancelled" first, deletes all the reservation informations registered by the reservation reference preliminary process from the table, sets the state in the reservation management table (504) to "reservation reference preliminary process failed" finally, and takes the step of error return (Step 69).

Figure 7:
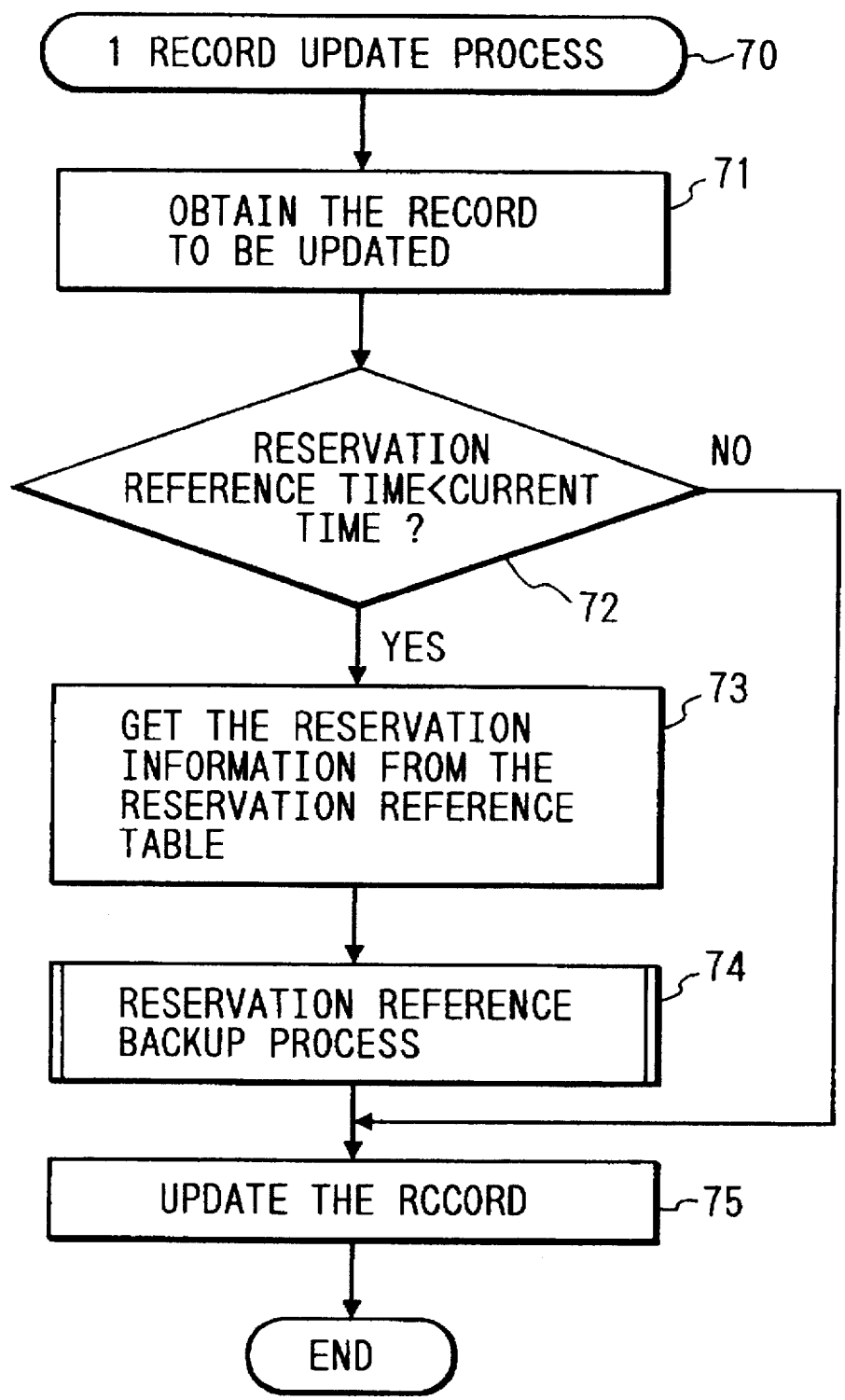
FIG. 7 is a flow chart of the 1 record update process in the second embodiment of the present invention.

FIG. 7 is a drawing showing the flow of the 1 record update process in this embodiment. The 1 record update process is a process for updating the content of a record and called from the update process of the database.

The 1 record update process (70) obtains the record to be updated first (Step 71) and checks the reservation reference time (506 or 508) of the record (Step 72). When the reservation reference time of the record is registered and the current time passes the reservation reference time, the 1 record update process (70) gets the reservation information (511) from the reservation reference table (502) using the access ID (507 or 509) of the record as a key (Step 73) and executes a reservation reference backup process which will be described later (Step 74). Thereafter, the 1 record update process (70) executes the update process of the record (Step 75) and ends the processing.

When the reservation update time of the record to access is not registered or the reservation update time of the record is not over at Step 72, the 1 record update process (70) does not execute the reservation reference backup process but executes the update process for the current record (Step 75) and ends the processing.

Figure 8:
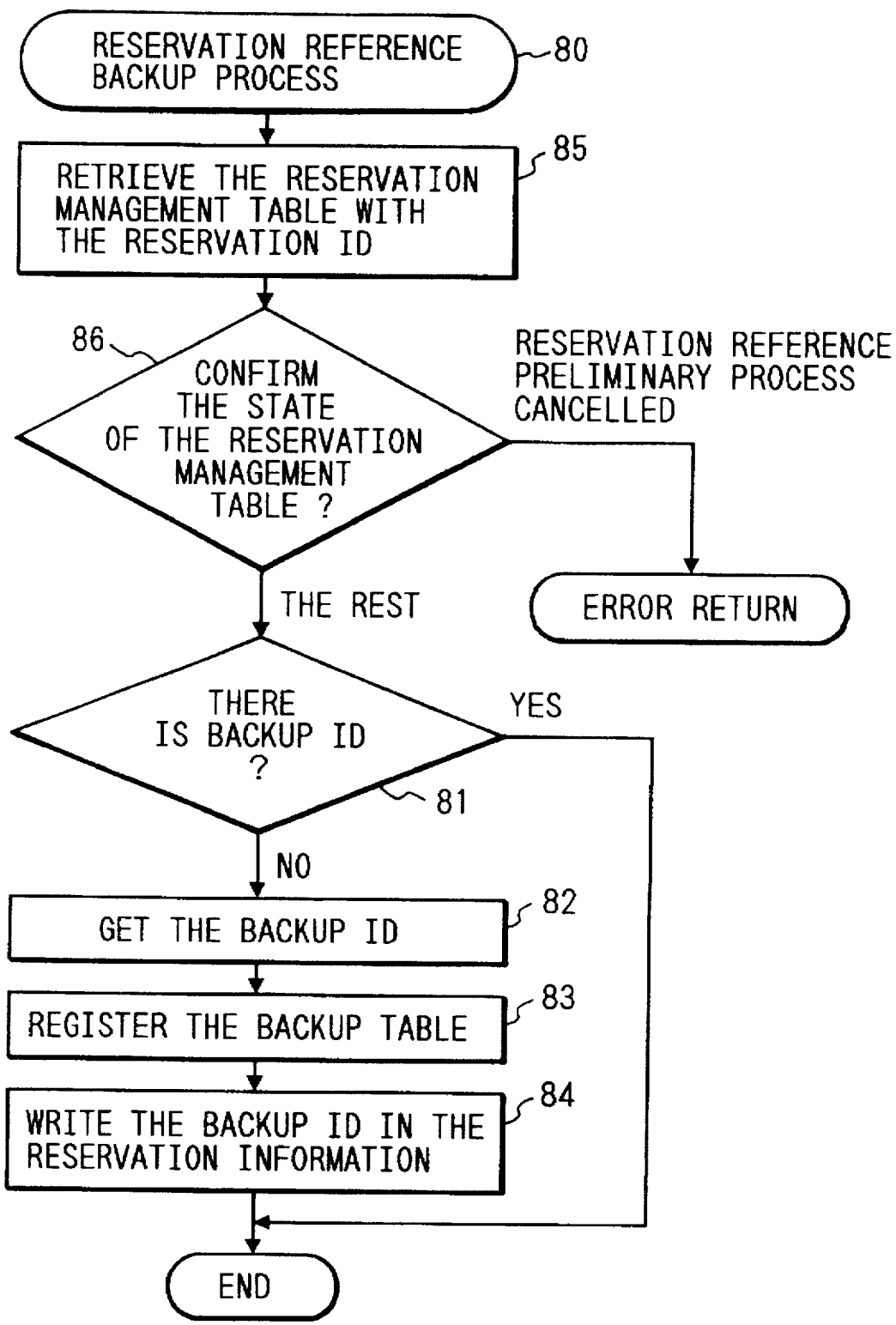
FIG. 8 is a flow chart of the reservation reference backup process in the second embodiment of the present invention.

FIG. 8 is a drawing showing the flow of the reservation reference backup process in this embodiment. The reservation reference backup process (80) retrieves the reservation management table (504) with the reservation ID (Step 85) and confirms the state (515) of the reservation management table (504) (Step 86). When the state (515) of the reservation management table (504) is "reservation reference preliminary process cancelled", the reservation reference backup process (80) takes the step of error return.

When the state (515) of the reservation management table (504) is other than "reservation reference preliminary process cancelled", the reservation reference backup process (80) gets the backup ID from the reservation information (511) corresponding to the record and checks whether there is a backup of the record or not (Step 81). When there is a backup of the record already, the reservation reference backup process (80) ends because there is no need to create a backup.

When there is not a backup of the record at Step 81, the reservation reference backup process (80) gets a backup ID newly (Step 82), registers the content of the record in the backup table (503) (Step 83), writes the obtained backup ID in the reservation information (511) (Step 84), and ends the processing.

Figure 9:
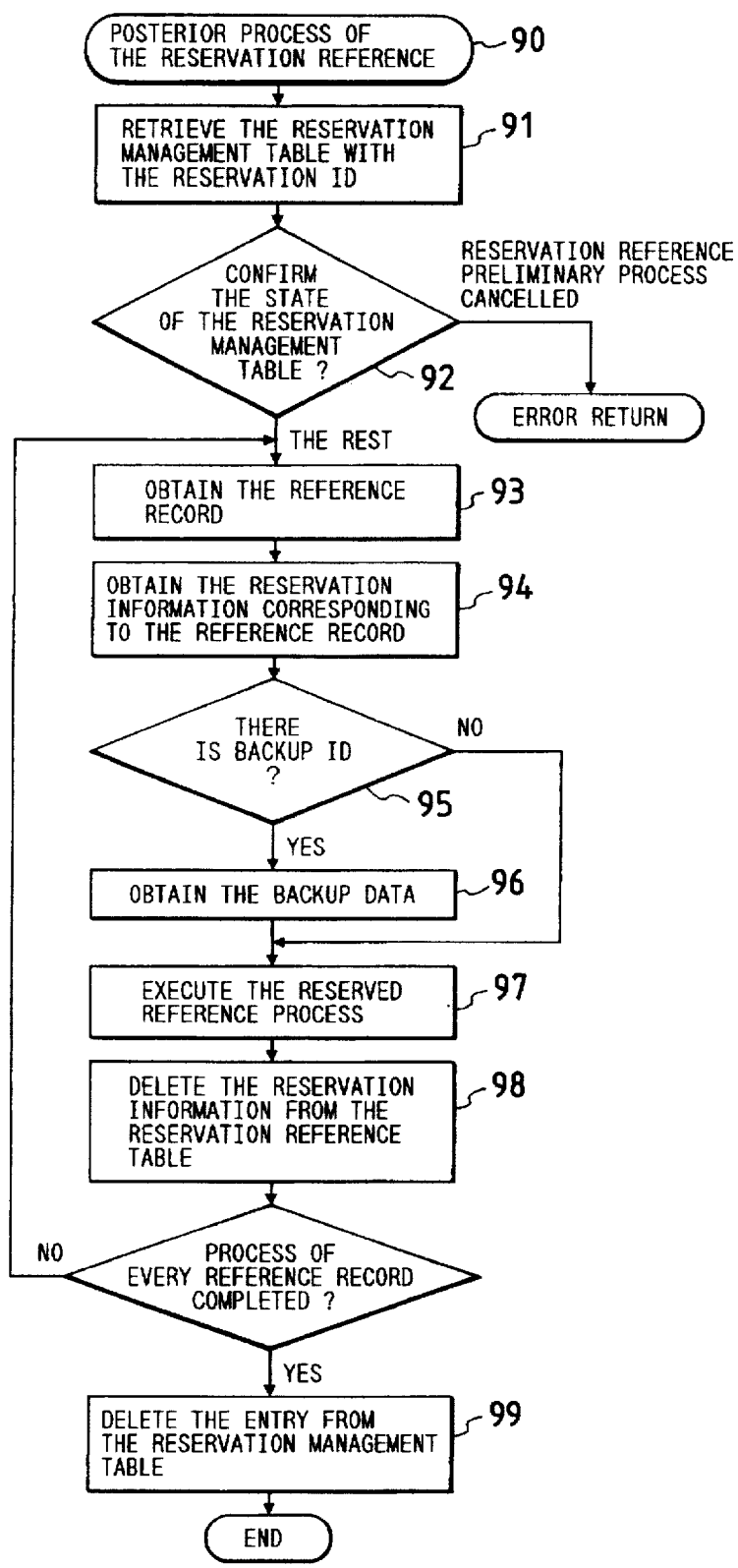
FIG. 9 is a flow chart of the reservation reference posterior process in the second embodiment of the present invention.

FIG. 9 is a drawing showing the flow of the reservation reference posterior process in this embodiment. The reservation reference posterior process (90) retrieves the reservation management table (504) with the reservation ID (Step 41) first and obtains the reservation state (515) and the reservation execution sentence (517) (Step 91). Next, the reservation reference posterior process (90) checks the state (515) of the reservation management table (504) (Step 92). When the state thereof is "reservation reference preliminary process cancelled", the reservation reference posterior process (90) returns as a reservation reference error. In other cases, the reservation reference posterior process (90) executes the following process for each reference record.

Firstly, the reservation reference posterior process (90) obtains the reference code as in an ordinary process (Step 93). Next, the reservation reference posterior process (90) gets the reservation information (511) corresponding to the record from the reservation reference table (502) and checks whether there is a backup of the record or not (Step 95).

When there is backup data, the reservation reference posterior process (90) obtains the backup data (513) of the record from the backup table (503) (Step 96) and goes to Step 97. When there is no backup data, the reservation reference posterior process (90) skips Step 96 and goes to Step 97.

The reservation reference posterior process (90) executes the reserved reference process according to the reservation execution sentence (Step 97) and then deletes the reservation information (511) from the reservation reference table (502) (Step 98). When there is backup data (513) of the record in this case, the reservation reference posterior process (90) also deletes the backup data. After the reference of all the records ends, the reservation reference posterior process (90) deletes the entry corresponding to the reservation reference from the reservation management table (504) (Step 99) and ends the processing.

In this embodiment, as to a record which is referred to for reservation, no backup of the record is created unless the update process is executed for the record after the reservation reference time. When the reservation reference posterior process ends, the backups created for this reservation reference process are all erased, so that, an area in the database will not be occupied for a long period of time. Therefore, it is possible to refer to large-scale data which is logically consistent by a minimum of backup.

Since all the processes can be realized by using the exclusive control for each record in the table, it is possible to refer to a large amount of records at the same time even when the system is in operation. It is also one of the characteristics of this embodiment that the present invention has a means for canceling the reservation reference information when the reservation time is over before the reservation reference preliminary process is completed.

It is obvious that this embodiment can be applied to every database of not only a relational type database system but also a structural type or hierarchical type database system which is accessed in record units.

Embodiment 3

Next, the third embodiment of the present invention will be explained. In this third embodiment, a method for providing reservation update and reservation reference for a database at the same time will be explained.

Figure 10:
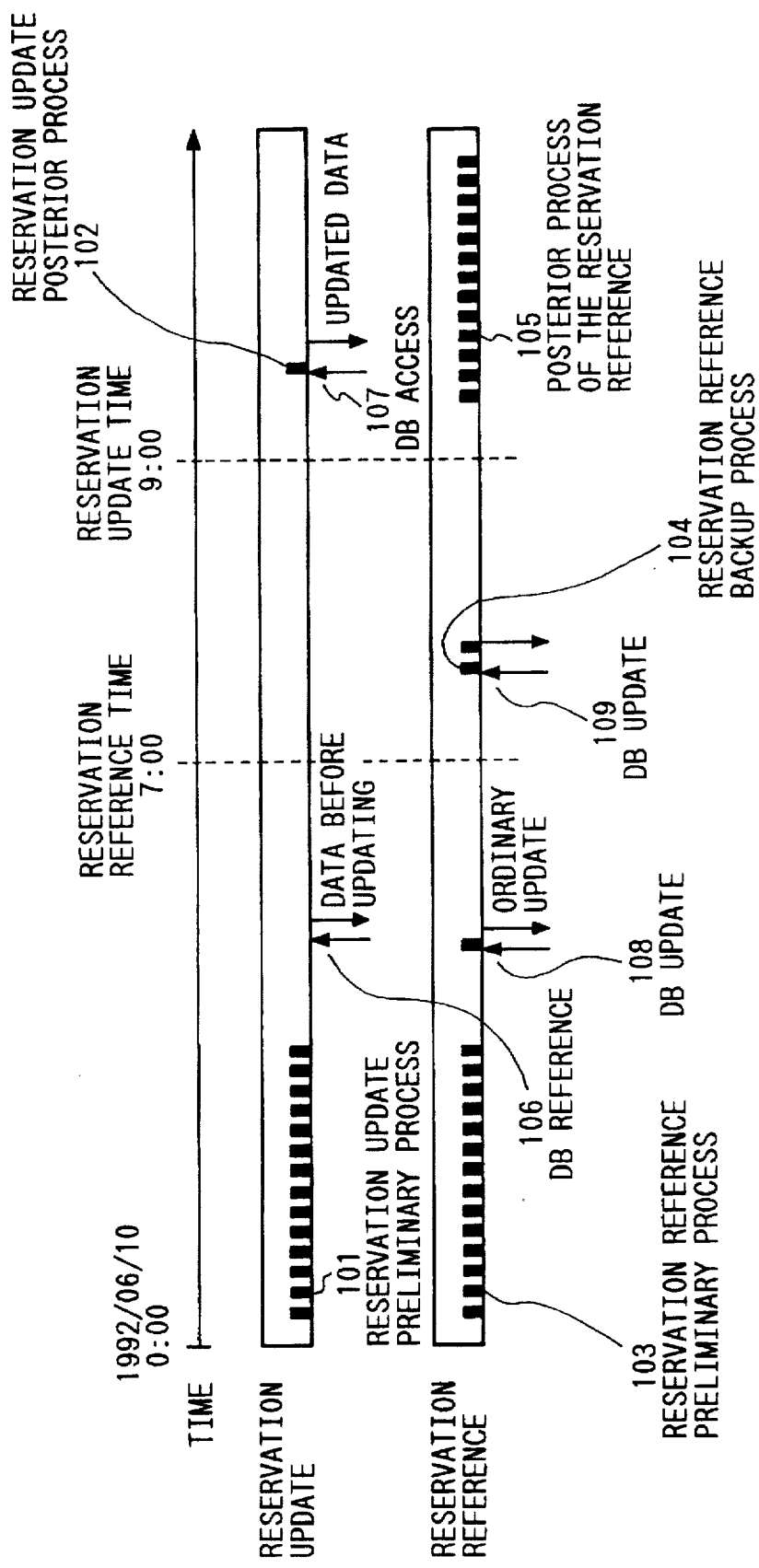
FIG. 10 is a schematic view of the processing in the third embodiment of the present invention.

FIG. 10 is a diagram for explaining the outline of the reservation update and reservation reference processes in this embodiment. The abscissa indicates flow of the time and each black quadrangle indicates a process which is executed at each time. The reservation update process is realized by two processes such as a reservation update preliminary process (101) and a reservation update posterior process (102) as in Embodiment 1. On the other hand, the reservation reference process is realized by three processes such as a reservation reference preliminary process (103), a reservation reference backup process (104), and a reservation reference posterior process (105) as in Embodiment 2.

When the reservation update process accesses a record for which the reservation update preliminary process (101) is completed before the reservation update time, it provides the data before updating (106) and when the reservation update process accesses the record after the update time, it executes the reservation update posterior process (102), executes the reserved update process, and then provides the updated data (107).

On the other hand, when the reservation reference process accesses a record for which the reservation reference preliminary process (103) is completed before the reservation reference time, it executes the update process as usual (108). When the reservation reference process executes the update process for the record after the reference time and before the reservation reference posterior process (105), it executes the reservation reference backup process (104), creates a backup of the record which is referred to for reservation, and executes the update process for the record (109).

When a backup of the reference record is created, the reservation reference posterior process (105) refers to the backup data. When there is no backup, the reservation reference posterior process (105) refers to the data of the record. The reservation reference posterior process (105) executes at a suitable timing after the reservation reference time. The timing for starting the reservation reference posterior process (105) can be realized by various methods such as starting it by a timer after the reference time or at the time of first occurrence of DB access after the reference time.

Figure 11:
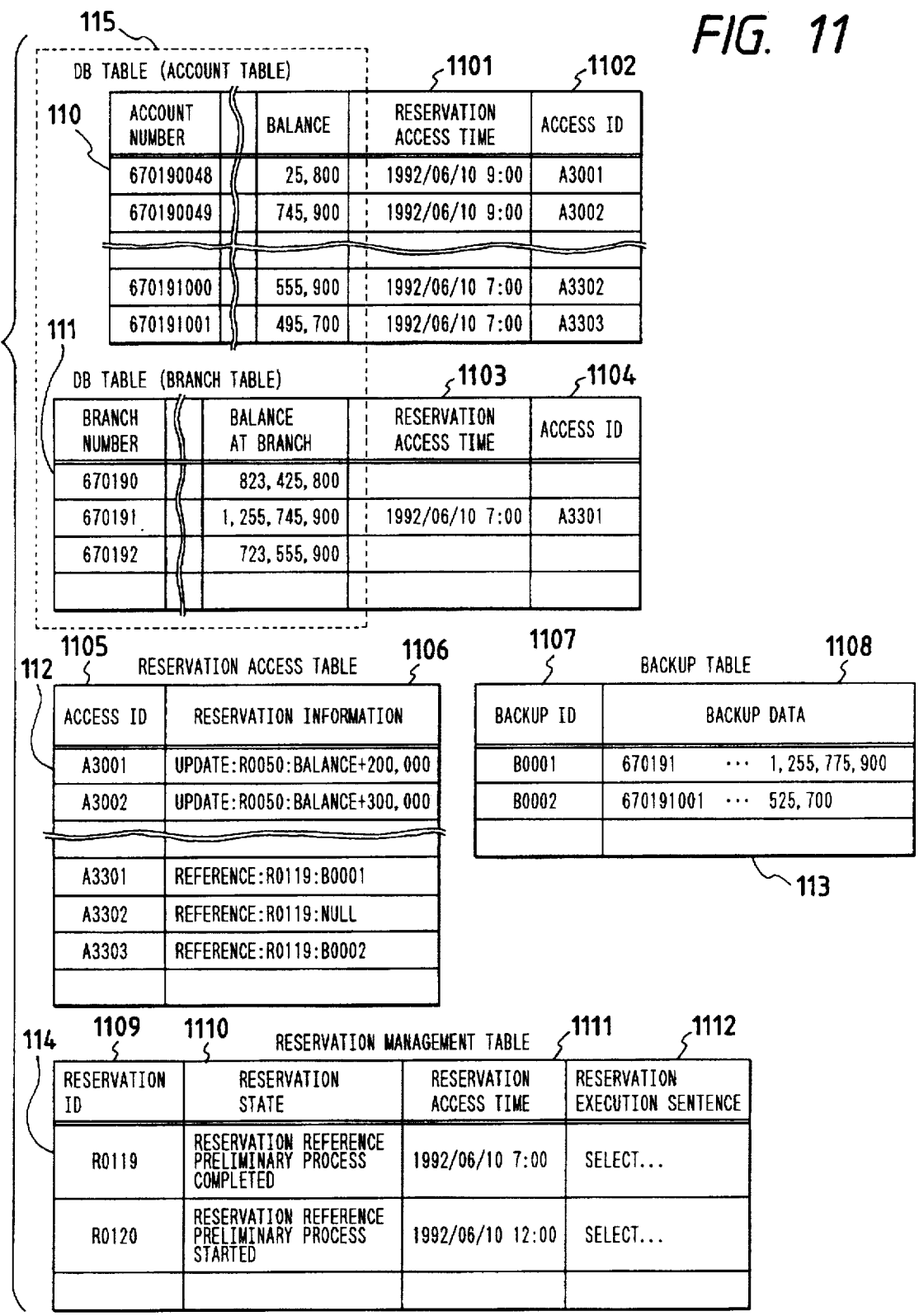
FIG. 11 is a table structural diagram in the third embodiment of the present invention.

FIG. 11 is a drawing showing the table structure for realizing the reservation update and reservation reference processes. An account table (110) and a branch table (111) are database tables (DB tables) created by an application program and a reservation access table (112), a backup table (113), and a reservation management table (114) are tables created by a database system so as to realize the reservation update and reservation reference processes.

Among the DB tables created by the application program, the application program can directly access only the portion (115) enclosed by a dashed line. The columns of reservation access time (1101 and 1103) and the columns of access ID (1102 and 1104) are added by the database system so as to realize the reservation update and reservation reference processes. The reservation access time of each record is stored in the columns of reservation access time (1101 and 1103) among the columns added to the DB tables. When nothing is stored in the columns of reservation access time (1101 and 1103), it indicates that no update or reference reservation process is executed for the record. In the columns of access ID (1102 and 1104), identifiers used to access the reservation access table are stored.

One reservation access table (112) exists in the database system and comprises an access ID (1105) and reservation information (1106). The access ID (1105) is a unique identifier in the reservation access table and establishes a correspondence between the DB tables (110 and 111) and the reservation access table (112). In the column of reservation information (1106), the kind (update or reference) of a reserved process and the reservation identifier (ID) of the process are stored. Furthermore, as additional information, the content of the update process is stored in the case of the update process and the backup identifier is described in the case of the reference process. The backup identifier (ID) indicates the backup ID when a backup exists and establishes a correspondence between the entries of the reservation access table (112) and the entries of the backup table (113).

One backup table (113) exists in the database system and comprises a backup ID (1107) and backup data (1108). The backup ID (1107) is a unique identifier in the backup table (113). In the column of backup data (1108), the backup of a record updated after the reservation access time (backup of the state before updating) is stored. In this embodiment, the backup is stored in record units. However, needless to say, it is also possible to create a backup of only a field to be referred to.

One reservation management table (114) exists in the database system and comprises a reservation ID (1109), a reservation state (1110), a reservation access time (1111), and a reservation execution sentence (1112).

The reservation ID (1109) is a number assigned to a reservation access process to be executed logically at the same time and a unique number in the database system. The reservation state (1110) indicates the processing state of the aforementioned reservation reference process to be executed at the same time. "Start the reservation update preliminary process", "reservation update preliminary process cancelled", "start the reservation reference preliminary process", "reservation reference preliminary process completed", and "reservation reference preliminary process cancelled" are processing states. "Start the reservation update preliminary process" and "start the reservation reference preliminary process" indicate that the preliminary process of the reservation access is being executed, and "reservation reference preliminary process completed" indicates that the preliminary process of the reservation reference terminates normally, and "reservation update preliminary process cancelled" and "reservation reference preliminary process cancelled" indicate that the registered preliminary reservation reference information is being cancelled because the preliminary process of the reservation access does not end before the reservation time.

On the other hand, the time for executing reservation access is stored in the column of reservation access time (1111) and the reserved reference execution sentence (query execution sentence or query execution code) is stored in the column of reservation execution sentence (1112).

In this embodiment, a reservation update process of a reservation ID of R0050, a reservation reference process of a reservation ID of R0119, and a reservation reference process of a reservation ID of R0120 are registered. The reservation update process of a reservation ID of R0050 is that the update time is 1992/06/10/9:00, and the reservation update preliminary process is completed at present, and 200,000 is added to the balance of the record of the account number 670190048 in the account table, and 300,000 is added to the balance of the record of the account number 670190049. The reservation reference process of a reservation ID of R0119 is that the reference time is 1992/06/10/ 7:00, and the reservation reference preliminary process is completed at present, and a record of the account number 670191000 and a record of 670191001 in the account table and a record of the branch number 670191 in the branch table are registered for reservation reference. Since the records of the account number 670191000 in the account table and the branch number 670191 in the branch table are updated after the reservation access time, the contents of the records at the point of reservation access time are stored in the backup table.

In the table structure shown in this embodiment, identifiers are used so as to establish a correspondence between the DB tables and the reservation access table, a correspondence between the reservation access table and the reservation management table, and a correspondence between the reservation access table and the backup table. Needless to say, pointers may be used to establish those correspondences.

Figure 12:
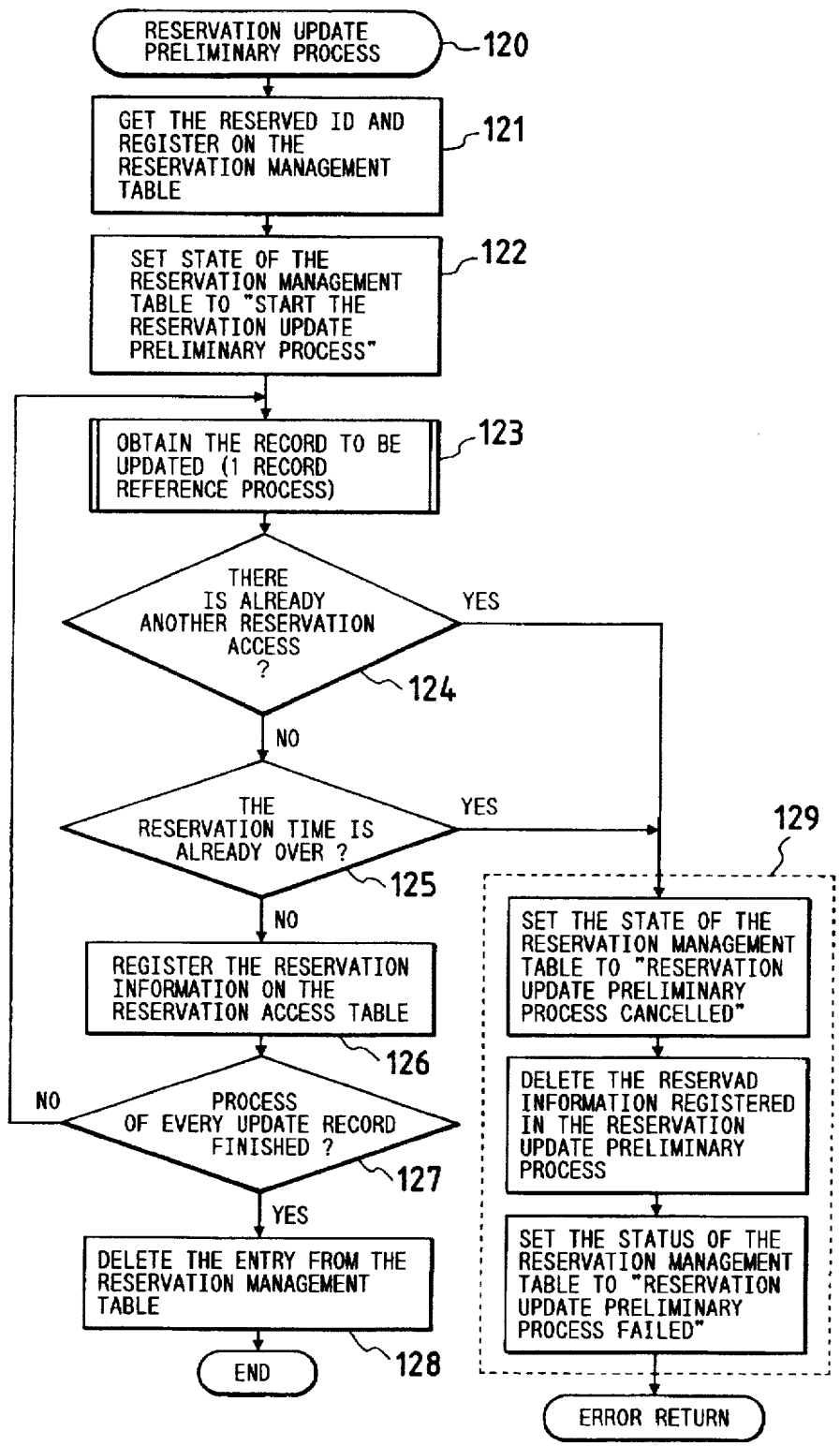
FIG. 12 is a flow chart of the reservation update preliminary process in the third embodiment of the present invention.

FIG. 12 is a drawing showing the flow of the reservation update preliminary process in this embodiment. The reservation update preliminary process (120) gets the reserved ID first and registers the reserved ID and reservation time in the reservation management table (114) (Step 121). The reservation ID is a unique identifier in the database system. Next, the reservation update preliminary process (120) sets the reservation state (1110) in the reservation management table (114) to "start the reservation update preliminary process" (Step 122) and executes the following process for every update record.

Firstly, the reservation update preliminary process (120) obtains the content of the record to be updated by a 1 record update process which will be described later (Step 123). Next, the reservation update preliminary process (120) confirms the field of reservation access time (1101 or 1103) of the record and decides whether another reservation access is already registered or not (Step 124). When another reservation access is already registered, the reservation update preliminary process (120) passes control to the error process (Step 129). When another reservation access is not registered, the reservation update preliminary process (120) checks whether the reservation time of the reservation update process which is being registered is already over or not (Step 125). When the reservation time is over, the reservation update preliminary process (120) passes control to the error process (Step 129) assuming that the reservation update preliminary process does not end before the appointed time.

When the reservation time is not over at Step 125, the reservation update preliminary process (120) registers the reservation information on the reservation access table (112) (Step 126) and goes to the process of the next update record (Step 127). The process kind of the reservation information (1106) is set to update process and the content of update process is set to the column name to be updated and update information.

When the registration of reservation information of every update record is completed (Step 127), the reservation update preliminary process (120) deletes the entry corresponding to the reservation update from the reservation management table (114) (Step 128) and ends the processing.

On the other hand, when an error occurs during registration of reservation information of each record, the reservation update preliminary process (120) sets the state (1110) in the reservation management table (114) to "reservation update preliminary process cancelled" first, deletes all the reservation informations registered by the reservation update preliminary process from the table, sets the state (1110) in the reservation management table (114) to "reservation update preliminary process failed" finally, and takes the step of error return (Step 129).

Figure 13:
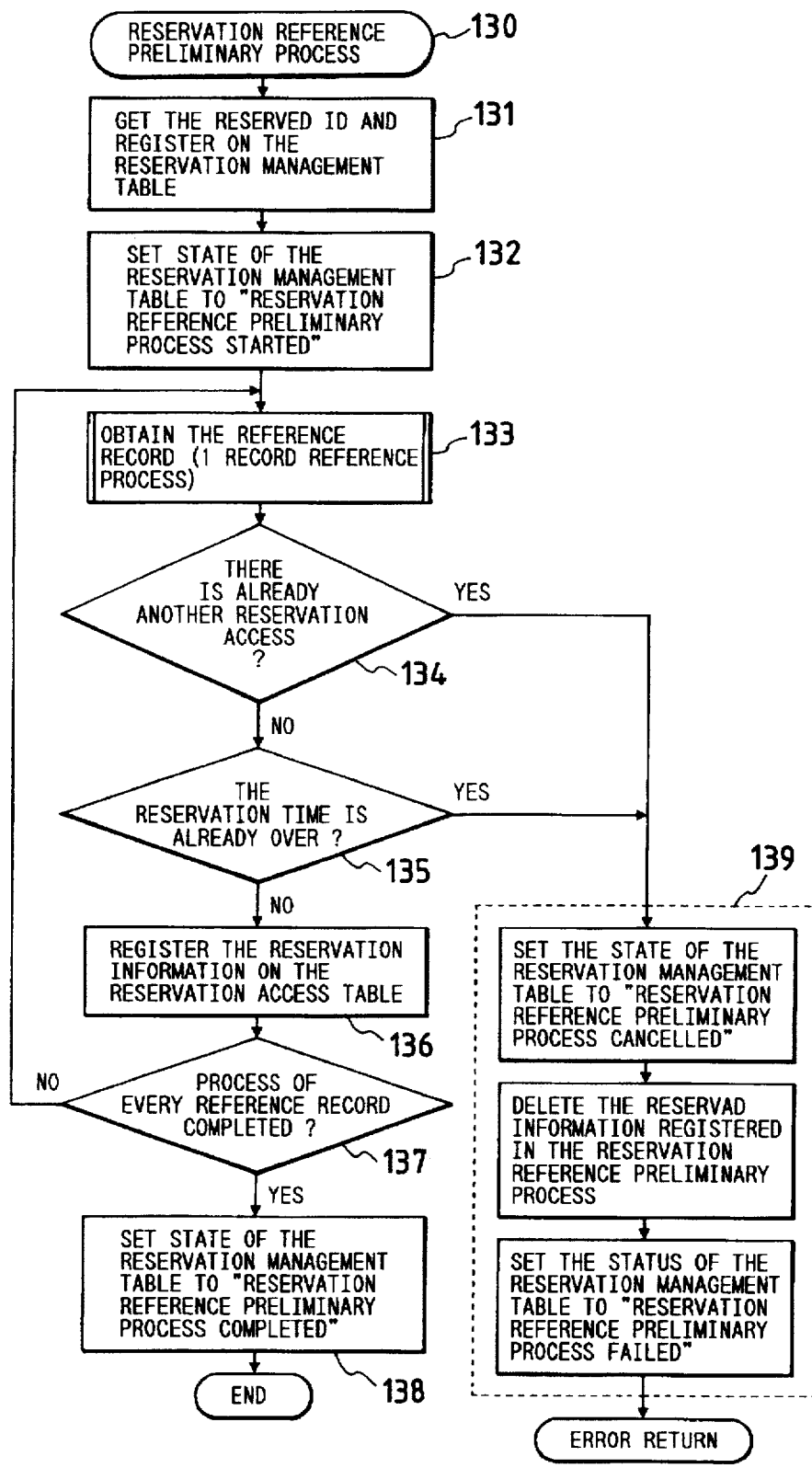
FIG. 13 is a flow chart of the reservation reference preliminary process in the third embodiment of the present invention.

FIG. 13 is a drawing showing the flow of the reservation reference preliminary process in this embodiment. The reservation reference preliminary process (130) gets the reserved ID first and registers the reserved ID, reservation time, and reservation execution sentence in the reservation management table (114) (Step 131). Next, the reservation reference preliminary process (130) sets the reservation state (1110) in the reservation management table (114) to "start the reservation reference preliminary process" (Step 132) and executes the following process for every reference record.

Firstly, the reservation reference preliminary process (130) obtains the record to be referred to by a 1 record update process which will be described later (Step 133). Next, the reservation reference preliminary process (130) confirms the field of reservation access time (1101 or 1103) of the record and decides whether another reservation access is already registered or not (Step 134). When another reservation access is already registered, the reservation reference preliminary process (130) passes control to the error process (Step 139). When another reservation access is not registered, the reservation reference preliminary process (130) checks whether the reservation time of the reservation reference process which is being registered is already over or not (Step 135). When the reservation time is over, the reservation reference preliminary process (130) passes control to the error process (Step 139) assuming that the reservation reference preliminary process does not end before the appointed time.

When the reservation time is not over at Step 135, the reservation reference preliminary process (130) registers the reservation information on the reservation access table (112) (Step 136) and goes to the process of the next reference record (Step 137). The process kind of the reservation information (1106) is set to reference and the backup ID is initialized to a null value (there is no backup data).

When the registration of reservation information of every reference record is completed (Step 137), the reservation reference preliminary process (130) sets the reservation state (1110) in the reservation management table (114) to "reservation reference preliminary process completed" (Step 138) and ends the processing.

On the other hand, when an error occurs during registration of reservation information of each record, the reservation reference preliminary process sets the state (1110) in the reservation management table (114) to "reservation reference preliminary process cancelled" first, deletes all the reservation informations registered by the reservation reference preliminary process from the table, sets the state (1110) in the reservation management table (114) to "reservation reference preliminary process failed" finally, and takes the step of error return (Step 139).

Figure 14:
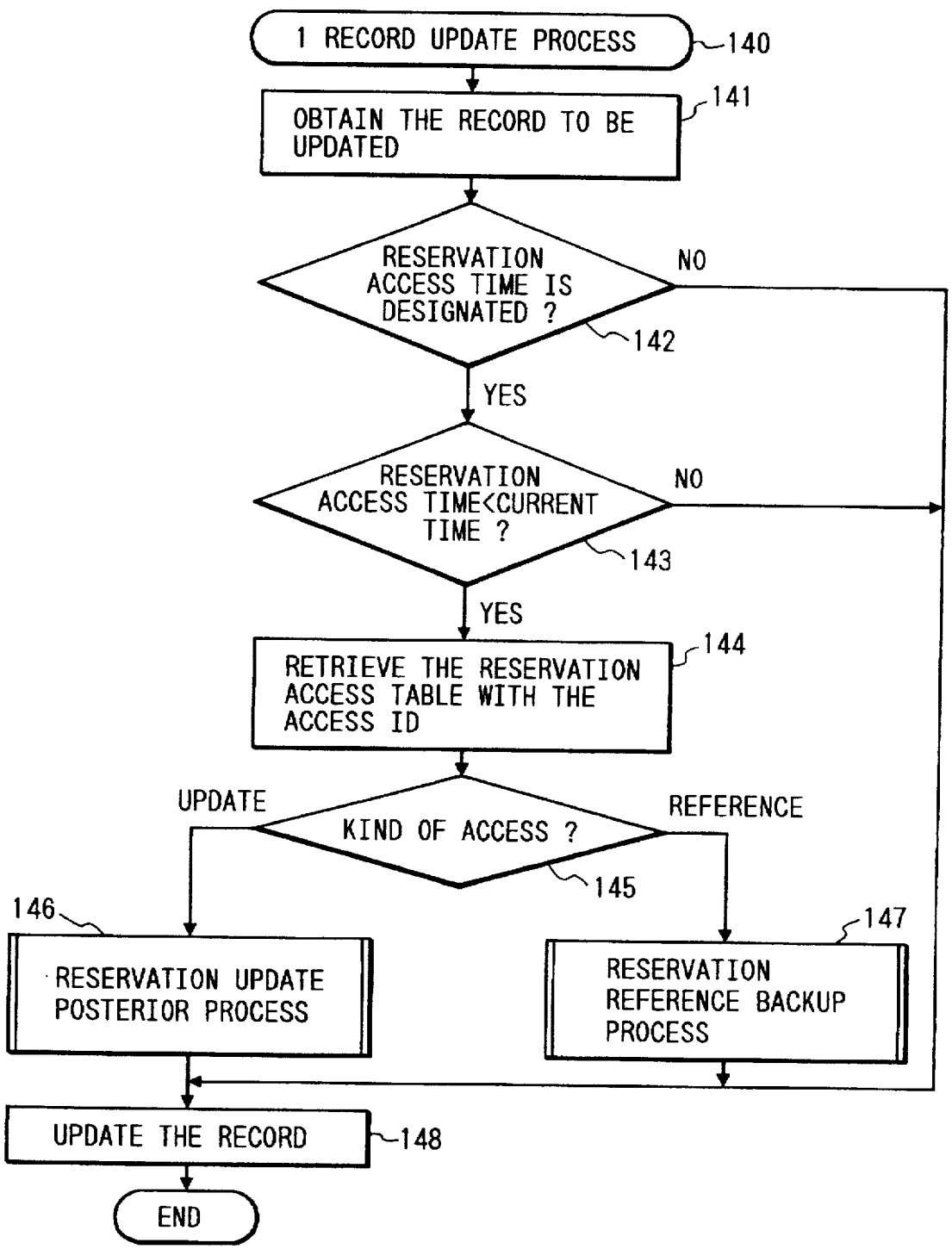
FIG. 14 is a flow chart of the 1 record update process in the third embodiment of the present invention.

FIG. 14 is a drawing showing the flow of the 1 record update process in this embodiment. The 1 record update process is a process for updating the content of a record and called from the update process of the database.

The 1 record update process (140) obtains the record to be updated first (Step 141) and checks the reservation access time (1101 or 1103) of the record (Step 142). When the reservation access time of the record is registered, the 1 record update process (140) decides whether the current time [page 29] passes the reservation access time or not (Step 143).

When the reservation access time of the record is registered and the current time passes the reservation access time, the 1 record update process (140) gets the reservation information (1106) from the reservation access table (112) using the access ID (1102 or 1104) of the record as a key (Step 144) and checks the access kind of the reservation information (1106) (Step 145).

When the access kind of the reservation information (1106) is update, the 1 record update process (140) executes a reservation update posterior process which will be described later (Step 146). When the access kind is reference, the 1 record update process (140) executes the reservation reference backup process (Step 147). Finally, the 1 record update process (140) executes the update process for the record (Step 148). The reservation reference backup process is exactly the same as that explained in Embodiment 2.

When the reservation access time of the record to access is not registered or the reservation access time of the record is not over at Step 142 or 143, the 1 record update process (140) executes the record update process as usual (Step 148).

Figure 15:
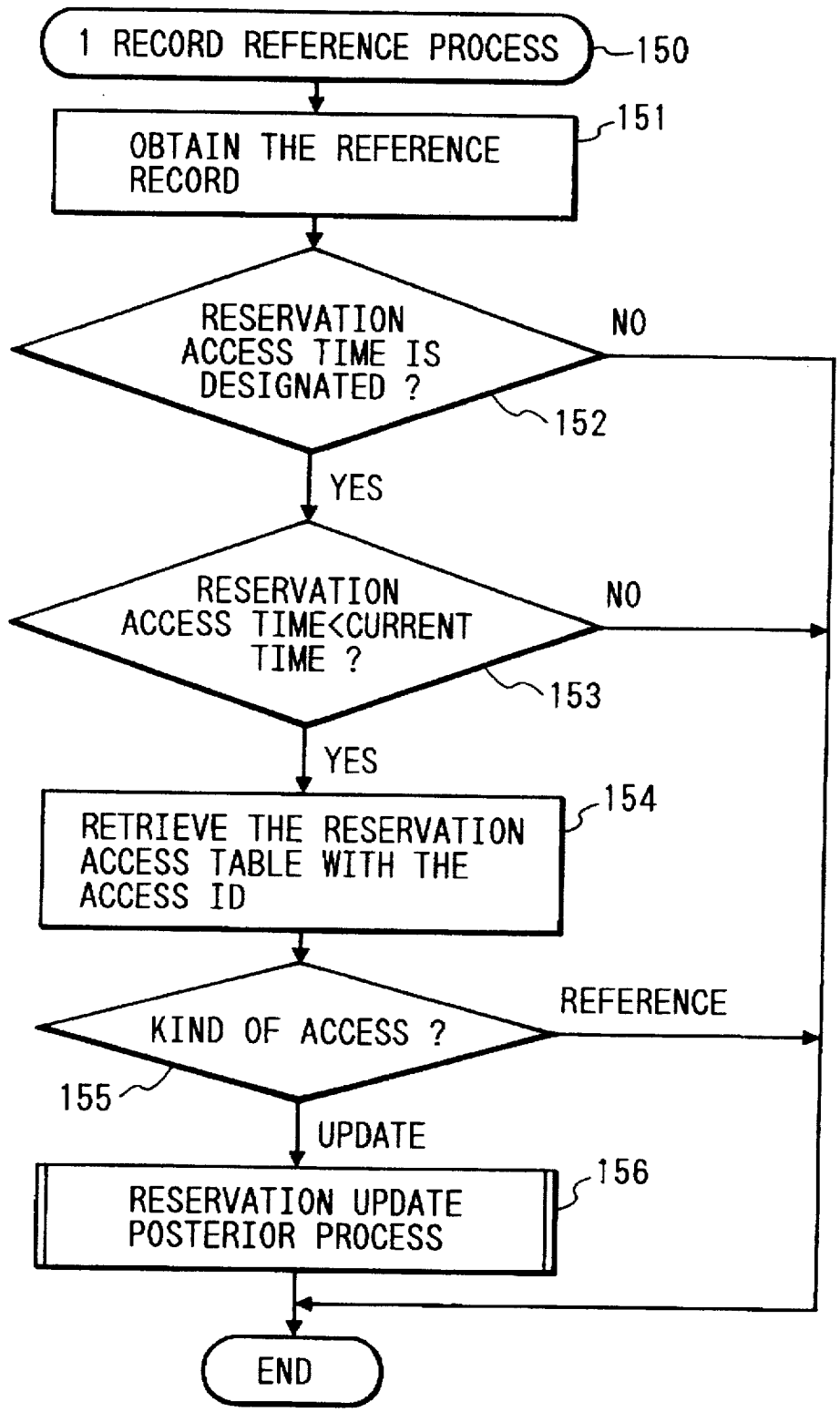
FIG. 15 is a flow chart of the 1 record reference process in the third embodiment of the present invention.

FIG. 15 is a drawing showing the flow of the 1 record reference process in this embodiment. The 1 record reference process is a process for referring to the content of a record and called from the reference process of the database.

The 1 record reference process (150) obtains the record to be referred to first (Step 151) and checks the reservation access time (1101 or 1103) of the record (Step 152). When the reservation access time of the record is registered, the 1 record reference process (150) decides whether the current time passes the reservation access time or not (Step 153). When the reservation access time of the record is registered and the current time passes the reservation access time, the 1 record reference process (150) gets the reservation information (1106) from the reservation access table (112) using the access ID (1102 or 1104) of the record as a key (Step 154) and checks the access kind of the reservation information (1106) (Step 155).

When the access kind of the reservation information (1106) is update, the 1 record reference process (150) executes a reservation update posterior process which will be described later (Step 156) and returns the updated data to the calling source as reference data. When the access kind is reference at Step 155, the 1 record reference process (150) returns the data of the record to the calling source as reference data as it is.

When the reservation access time of the record to access is not registered or the reservation access time of the record is not over at Step 152 or 153, the 1 record reference process (150) returns the data of the record to the calling source as reference data as it is.

Figure 16:
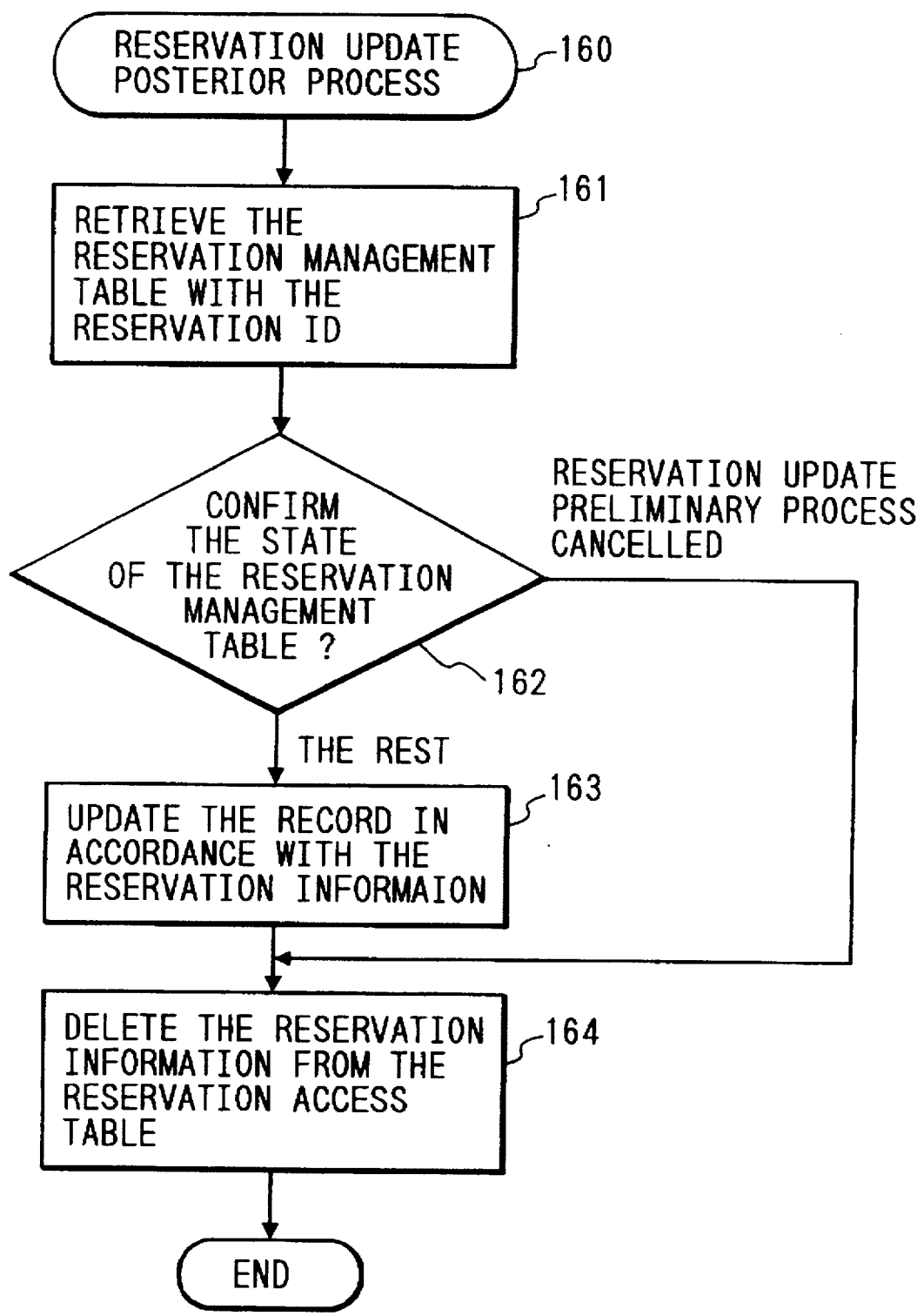
FIG. 16 is a flow chart of the reservation update posterior process in the third embodiment of the present invention.

FIG. 16 is a drawing showing the flow of the reservation update posterior process in this embodiment. The reservation update posterior process (160) retrieves the reservation management table (114) with the reservation ID first (Step 161) and confirms the state (1110) of the reservation management table (114) (Step 162). Next, when the state (1110) of the reservation management table (114) is other than "reservation update preliminary process cancelled", the reservation update posterior process (160) updates the record according to the reservation information (1106) (Step 163) and then deletes the reservation information (1106) from the reservation access table (112) (Step 164). When the state (1110) of the reservation management table (114) is "reservation update preliminary process cancelled" at Step 162, the reservation update posterior process (160) does not update the record and deletes the reservation information (1106) from the reservation access table (112) (Step 164) and the reservation update posterior process ends.

Figure 17:
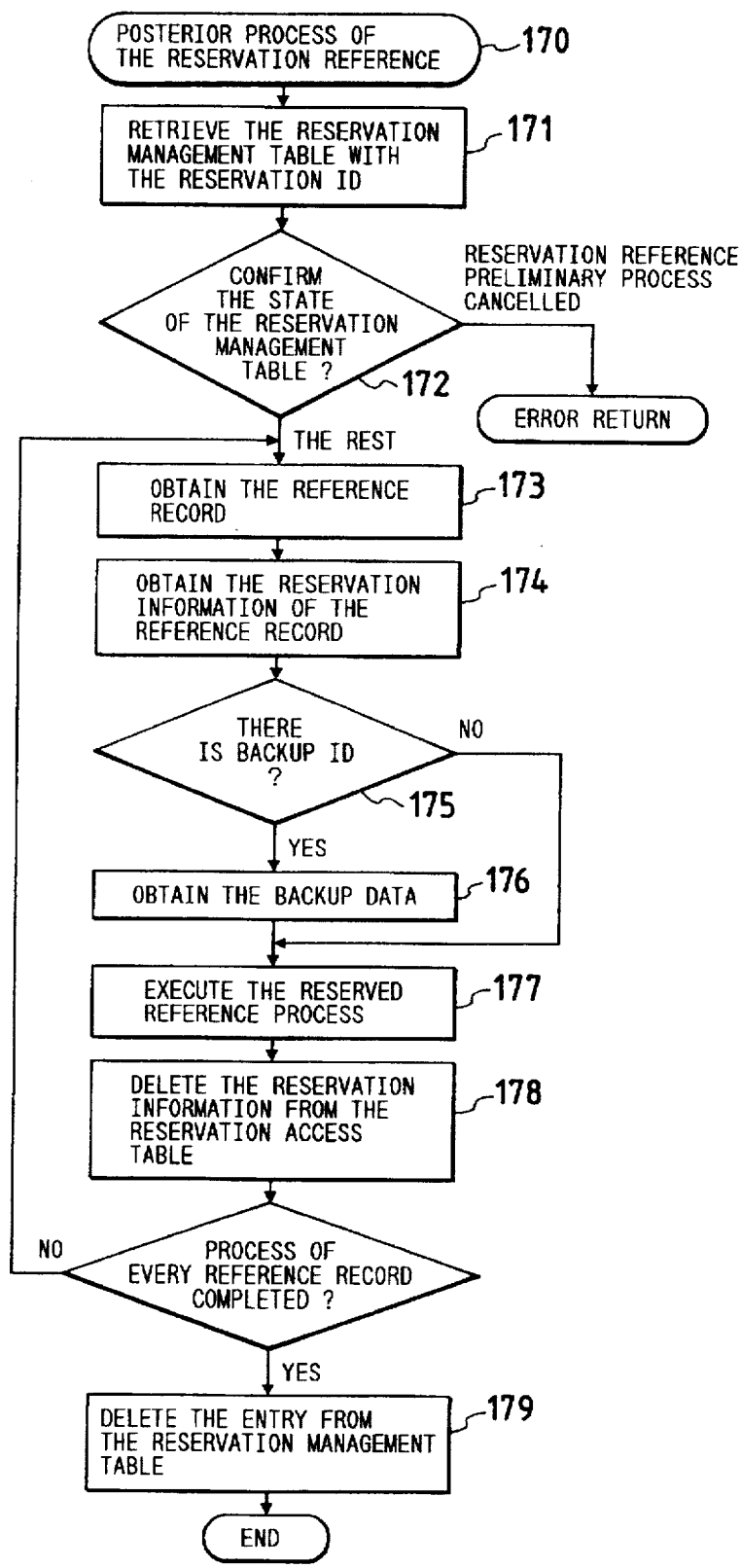
FIG. 17 is a flow chart of the reservation reference posterior process in the third embodiment of the present invention.

FIG. 17 is a drawing showing the flow of the reservation reference posterior process in this embodiment. The reservation reference posterior process (170) retrieves the reservation management table (114) with the reservation ID first and obtains the reservation state (1110) and the reservation execution sentence (1112) (Step 171). Next, when the state (1110) of the reservation management table (114) is "reservation reference preliminary process cancelled", the reservation reference posterior process (170) returns as a reservation reference error. In other cases, the reservation reference posterior process (170) executes the following process for each reference record.

Firstly, the reservation reference posterior process (170) obtains the reference code as in an ordinary process (Step 173). Next, the reservation reference posterior process (170) gets the reservation information (1106) corresponding to the record from the reservation access table (112) (Step 177) and checks whether there is a backup of the record or not (Step 175).

When there is backup data, the reservation reference posterior process (170) obtains the backup data (1108) of the record from the backup table (113) (Step 176) and goes to Step 177. When there is no backup data, the reservation reference posterior process (170) goes to Step 177 as it is.

The reservation reference posterior process (170) executes the reserved reference process according to the reservation execution sentence (Step 177) and then deletes the reservation information (1106) from the reservation access table (112) (Step 178). When there is backup data (1108) of the record in this case, the reservation reference posterior process (170) also deletes the backup data. After the reference of all the records ends, the reservation reference posterior process (170) deletes the entry corresponding to the reservation reference from the reservation management table (114) (Step 179) and ends the processing.

This embodiment is characterized in that the reservation update process described in Embodiment 1 and the reservation reference process described in Embodiment 2 are realized at the same time. In this embodiment, to realize these processes at the same time, the access kind is added as reservation information and whether to execute the reservation update posterior process or to execute the backup process is determined by deciding the access kind in the 1 record update process and 1 record reference process.

In this embodiment, by realizing the reservation update and reservation reference processes as a function of the database, it is possible to show an application program as if the update process for a large amount of records and the reference process for a large amount of records are executed instantaneously. As a result, various large-scale database processes which are conventionally required to execute in the state that the database system is stopped such as a data backup process, a database statistical process, an online batch process for salary transfer, and others can be executed when the system is in operation. By doing this, a non-stop running function of a database system such as 24 hour continuous running of a bank online system can be realized easily.

It is obvious that this embodiment can be applied to every database of not only a relational type database system but also a structural type or hierarchical type database system which is accessed in record units.

Embodiment 4

The reservation access process described in Embodiment 1 to Embodiment 3 is specified so that only one reservation access process can be registered for one record and when new reservation access is registered for a record which is already registered for reservation access, the reservation access process takes the step of error return.

In Embodiment 4, a method for realizing a multi-reservation access registration function which can register a plurality of reservation accesses for a record will be explained. In this embodiment, an example in which the multi-reservation access registration function is added to the method for realizing the reservation update and reservation reference processes at the same time which is described in Embodiment 3 is indicated. However, it can be also realized easily by the same system to add the multi-reservation access registration function to Embodiment 1 and Embodiment 2.

FIG. 18 is a drawing showing the table structure for realizing the multi-reservation accessregistration function. An account table (181) and a branch table (182) are database tables (DB tables) created by an application program and a reservation access table (183), a backup table (184), and a reservation management table (185) are tables created by a database system so as to realize the multi-reservation access registration function.

Among the DB tables created by the application program, the application program can directly access only the portion (186) enclosed by a dashed line. The columns of reservation access time (1801 and 1803) and the columns of access ID (1802 and 1804) are added by the database system so as to realize the reservation update and reservation reference processes. The reservation access time of a process, the processing time of which is shortest, among the reservation access processes registered in each record is stored in the columns of reservation access time (1801 and 1803) among the columns added to the DB tables. When nothing is stored in the columns of reservation access time (1801 and 1803), it indicates that no update or reference reservation process is registered for the record. In the columns of access ID (1802 and 1804), the identifier corresponding to the process, the processing time of which is shortest, among the reservation access processes registered in each record is stored.

One reservation access table (183) exists in the database system and comprises an access ID (1805), reservation information (1806), the next access time (1807) registered next to the reservation access process, and the next access ID (1808).

The access ID (1805) is a unique identifier in the reservation access table (183) and establishes a correspondence between the DB tables (181 and 182) and the reservation access table (183). In the column of reservation information (1806), the kind (update or reference) of a reserved process and the reservation identifier of the process are stored. Furthermore, as additional information, the content of the update process is stored in the case of the update process and the backup identifier is described in the case of the reference process.

When there are a plurality of reservation accesses in one record, the plurality of reservation access processes are arranged in the ascending order of reservation time and registered sequentially in the columns of next reservation access time (1807) and next reservation access ID (1808) of the reservation access table (183). When the next reservation access time (1807) and the next access ID (1808) are not registered, it indicates that the reservation access is the last of the reservation access processes registered in the record. This chain of entries in the reservation access table (183) is called a reservation access list in the following explanation.

One backup table (184) exists in the database system and comprises a backup ID (1810) and backup data (1811). The backup ID (1810) is a unique identifier in the backup table (184). The backup ID (1810) indicates a backup identifier when there is a backup and establishes a correspondence between the entries of the reservation access table (183) and the entries of the backup table (184). In the column of backup data (1811), the backup of a record updated after the reservation access time is stored. In this embodiment, the backup is stored in record units. However, needless to say, it is also possible to create a backup of only a field to be referred to.

One reservation management table (185) exists in the database system and comprises a reservation ID (1812), a reservation state (1813), a reservation access time (1814), and a reservation execution sentence (1815).

The reservation ID (1812) is a number assigned to a reservation access process to be executed logically at the same time and a unique number in the database system. The reservation state (1813) indicates the processing state of the aforementioned reservation reference process to be executed at the same time. "Start the reservation update preliminary process", "reservation update preliminary process cancelled", "start the reservation reference preliminary process", "reservation reference preliminary process completed", and "reservation reference preliminary process cancelled" are processing states. "Start the reservation update preliminary process" and "start the reservation reference preliminary process" indicate that the preliminary process of the reservation access is being executed, and "reservation reference preliminary process completed" indicates that the preliminary process of the reservation reference terminates normally, and "reservation update preliminary process cancelled" and "reservation reference preliminary process cancelled" indicate that the registered reservation reference information is being cancelled because the preliminary process of the reservation access does not end before the reservation time.

On the other hand, the time for executing reservation access is stored in the column of reservation access time (1814) and the reserved reference execution sentence (query execution sentence or query execution code) is stored in the column of reservation execution sentence (1815).

In this embodiment, a reservation update process of a reservation ID of R0050, a reservation reference process of a reservation ID of R0119, and a reservation reference process of a reservation ID of R0120 are registered. Two reservation access processes such as a reservation update process of an access ID of A0002 and a reservation reference process of an access ID of A0350 are registered in the record of the account number 670190049 in the account table. The reservation time of the reservation update process of an access ID of A0002 is 9:00 and the reservation time of the reservation reference process of an access ID of A0350 is 12:00. Therefore, the reservation update process of an access ID of A0002 is registered at the top of the reservation access list and the reservation reference process of an access ID of A0350 is registered in the next portion in the reservation access list.

In the table structure shown in this embodiment, identifiers are used so as to establish a correspondence between the DB tables and the reservation access table, a correspondence between the reservation access table and the reservation management table, and a correspondence between the reservation access table and the backup table. Needless to say, pointers may be used to establish those correspondences.

Figure 19:
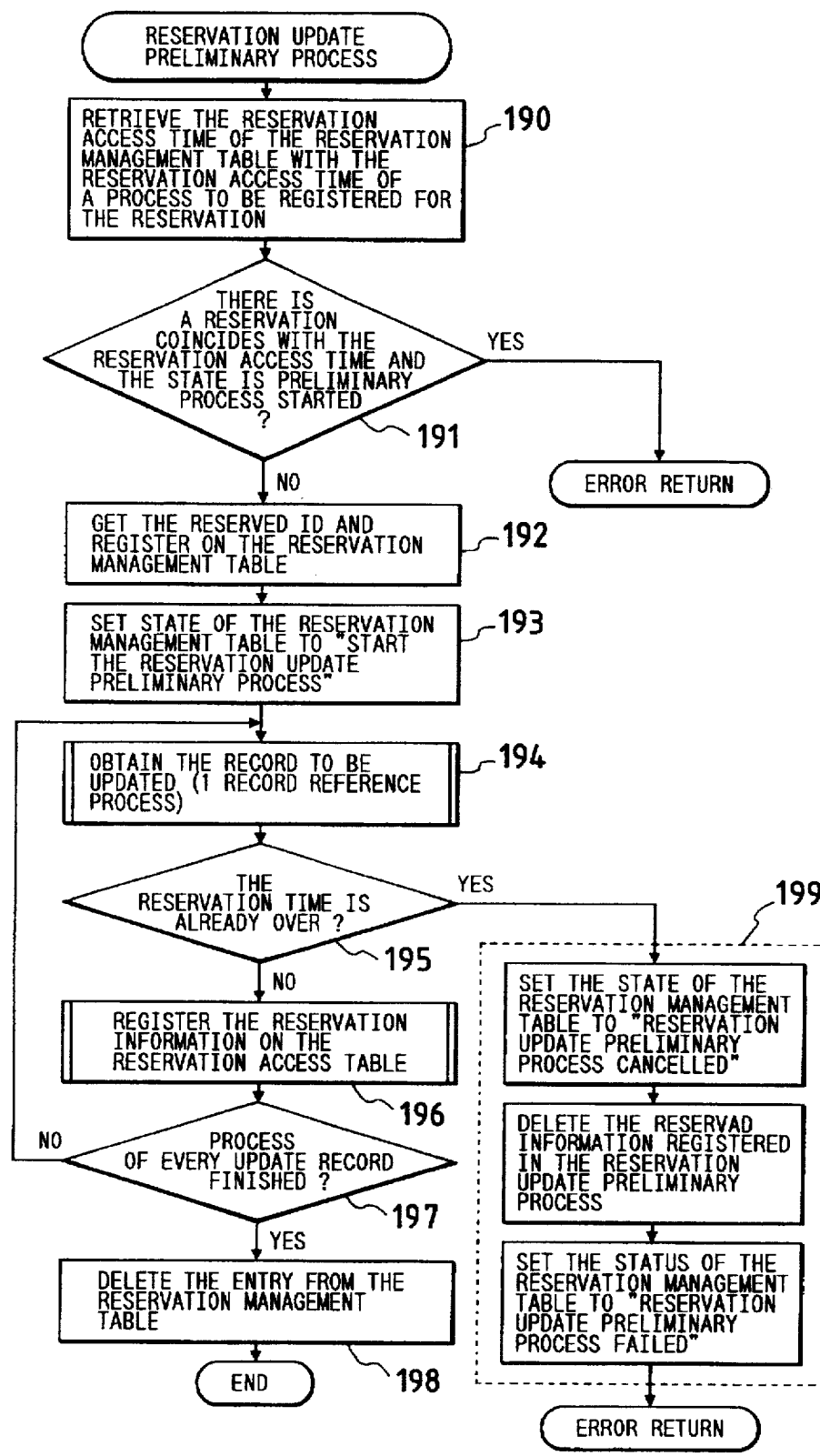
FIG. 19 is a flow chart of the reservation update preliminary process in the fourth embodiment of the present invention.

FIG. 19 is a drawing showing the flow of the reservation update preliminary process in this embodiment. The reservation update preliminary process retrieves the reservation access time (1814) of the reservation management table (185) with the reservation access time of a reservation access to be registered first (Step 190) and decides whether there is a reservation access which coincides with the access time and the state is preliminary process started or not (Step 191). When there is a reservation access which coincides with the access time and the state is preliminary process started, the reservation update preliminary process takes the step of error return because it collides with another reservation access preliminary process. The application program receiving this error return can recover from the error state by changing the reservation access time or waiting until the reservation access preliminary process which is in execution at present ends.

When the collision check of the reservation access preliminary process (Step 191) is completed, the reservation update preliminary process gets the reservation ID, registers the reservation ID and reservation time on the reservation management table (185) (Step 192), and sets the reservation state (1813) in the reservation management table (185) to "start the reservation update preliminary process" (Step 193). Then, the reservation update preliminary process executes the following process for every update record.

Firstly, the reservation update preliminary process obtains the content of the record to be updated by a 1 record update process which will be described later (Step 194). Next, the reservation update preliminary process checks whether the reservation time of the reservation update process which is being registered is already over or not (Step 195). When the reservation time is over, the reservation update preliminary process passes control to the error process (Step 199) assuming that the reservation update preliminary process does not end before the appointed time.

When the reservation time is not over at Step 195, the reservation update preliminary process registers the reservation information on the reservation access table (183) (Step 196) and goes to the process of the next update record (Step 197). As to registration of the reservation information (1806) on the access table (183), the reservation access information is registered immediately before reservation information having an access time which is later than the reservation access time. When there is no reservation information having an access time which is later than the reservation access time, the reservation update preliminary process registers the reservation access information at the end of the reservation access list. The process kind of the reservation information (1806) is set to update process and the content of update process is set to the column name to be updated and update information.

When the registration of reservation information of every update record is completed (Step 197), the reservation update preliminary process deletes the entry corresponding to the reservation update from the reservation management table (185) (Step 198) and ends the processing.

On the other hand, when an error occurs during registration of reservation information of each record, the reservation update preliminary process sets the state in the reservation management table (185) to "reservation update preliminary process cancelled" first, deletes all the reservation informations registered by the reservation update preliminary process from the table, sets the state in the reservation management table (185) to "reservation update preliminary process failed" finally, and takes the step of error return (Step 199).

Figure 20:
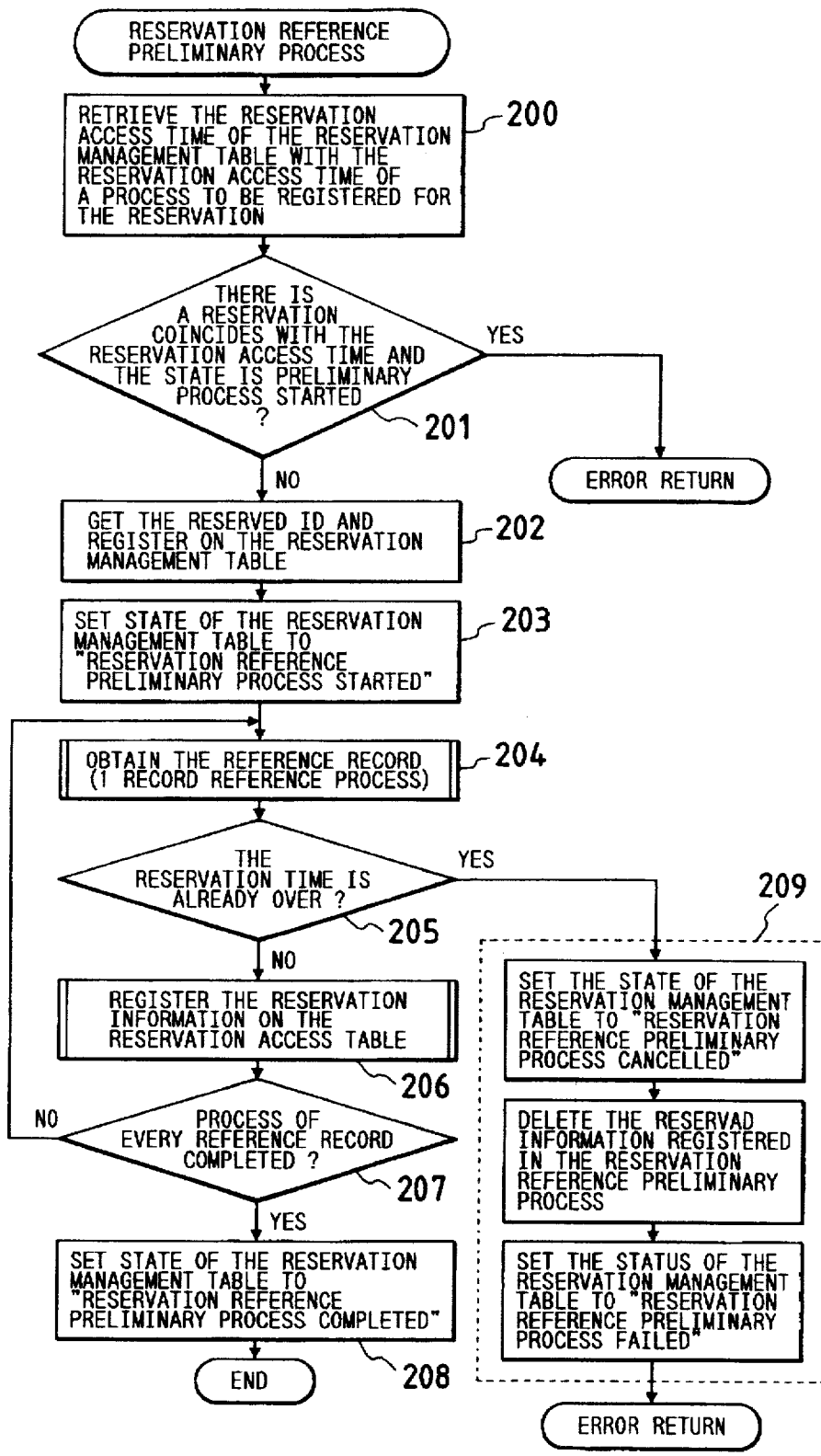
FIG. 20 is a flow chart of the reservation reference preliminary process in the fourth embodiment of the present invention.

FIG. 20 is a drawing showing the flow of the reservation reference preliminary process in this embodiment. The reservation reference preliminary process retrieves the reservation access time (1814) of the reservation management table (185) with the reservation access time of a reservation access to be registered first (Step 200) and decides whether there is a reservation access which coincides with the access time and the state is preliminary process started or not (Step 201). When there is a reservation access which coincides with the access time and the state is preliminary process started, the reservation reference preliminary process takes the step of error return because it collides with another reservation access preliminary process. The application program receiving this error return can recover from the error state by changing the reservation access time or waiting until the reservation access preliminary process which is in execution at present ends.

When the collision check of the reservation access preliminary process (Step 201) is completed, the reservation reference preliminary process gets the reservation ID, registers the reservation ID, reservation time, and reservation execution sentence on the reservation management table (185) (Step 202), and sets the reservation state (1813) in the reservation management table (185) to "start the reservation reference preliminary process" (Step 203). Then, the reservation reference preliminary process executes the following process for every reference record.

Firstly, the reservation reference preliminary process obtains the content of the record to be referred to by a 1 record reference process which will be described later (Step 204). Next, the reservation reference preliminary process checks whether the reservation time of the reservation reference process which is being registered is already over or not (Step 205). When the reservation time is over, the reservation reference preliminary process passes control to the error process (Step 209) assuming that the reservation reference preliminary process does not end before the appointed time.

When the reservation time is not over at Step 205, the reservation reference preliminary process registers the reservation information on the reservation access table (183) (Step 206) and goes to the process of the next reference record (Step 207). As to registration of the reservation information (1806) on the access table (183), the reservation access information is registered immediately before reservation information having an access time which is later than the reservation access time. When there is no reservation information having an access time which is later than the reservation access time, the reservation reference preliminary process registers the reservation access information at the end of the reservation access list. The process kind of the reservation information (1806) is set to reference and the backup ID is initialized to a null value (there is no backup data).

When the registration of reservation information of every reference record is completed (Step 207), the reservation reference preliminary process sets the reservation state (1813) in the reservation management table (185) to "reservation reference preliminary process completed" and ends the processing.

On the other hand, when an error occurs during registration of reservation information of each record, the reservation reference preliminary process sets the state in the reservation management table (185) to "reservation reference preliminary process cancelled" first, deletes all the reservation informations registered by the reservation reference preliminary process from the table, sets the state in the reservation management table (185) to "reservation reference preliminary process failed" finally, and takes the step of error return (Step 209).

Figure 21:
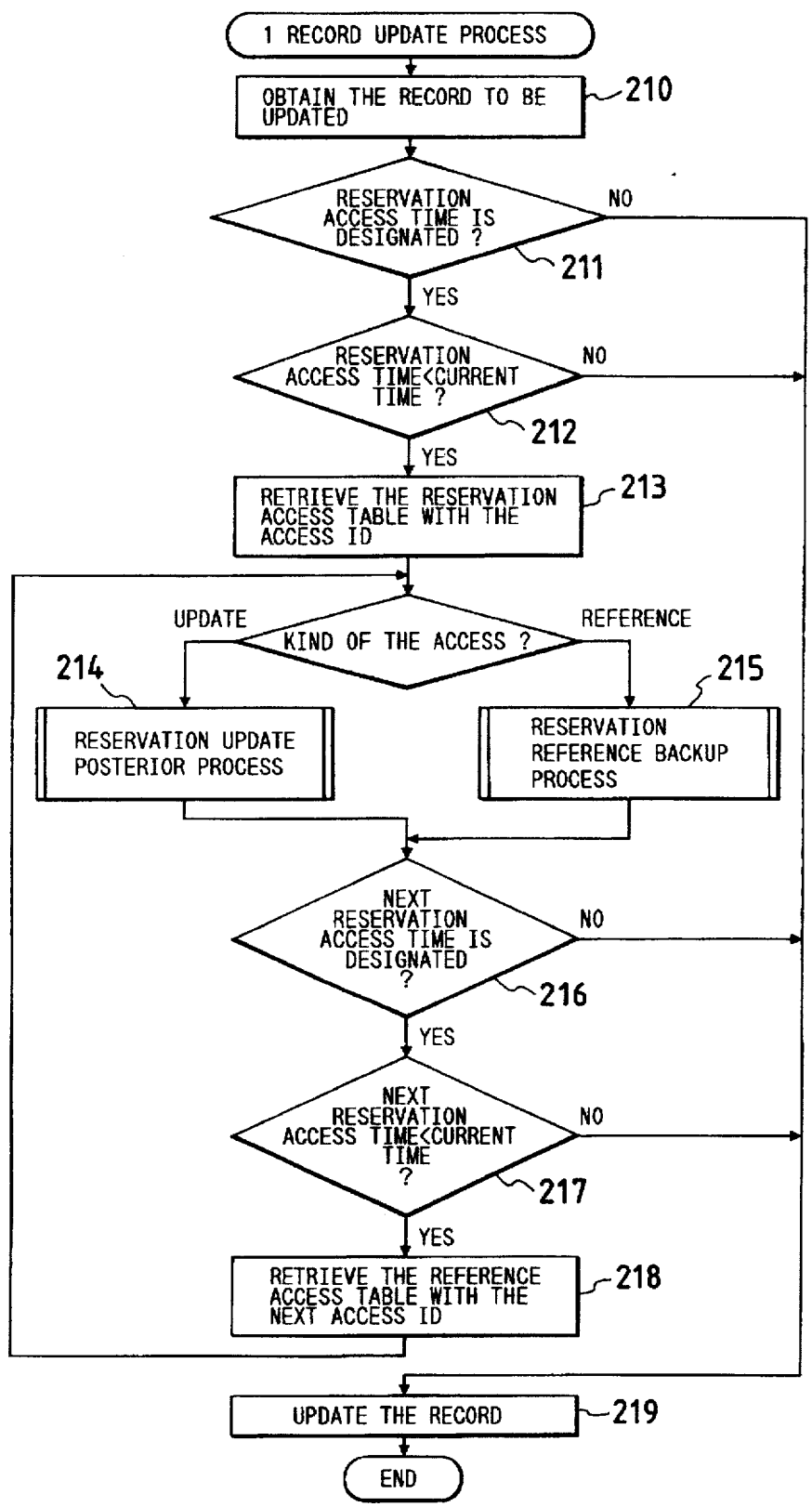
FIG. 21 is a flow chart of the 1 record update process in the fourth embodiment of the present invention.

FIG. 21 is a drawing showing the flow of the 1 record update process in this embodiment. The 1 record update process is a process for updating the content of a record and called from the update process of the database.

The 1 record update process obtains the record to be updated first (Step 210) and checks the reservation access time (1801 or 1803) of the record (Step 211). When the reservation access time of the record to access is registered, the 1 record update process decides whether the current time passes the reservation access time of the record or not (Step 212). When the reservation access time of the record to access is not registered or the reservation access time of the record is not over, the 1 record update process executes the update process for the record (Step 219) as usual.

When the reservation access time of the record is registered and the current time passes the reservation access time at Step 211 or 212, the 1 record update process gets the reservation information (1806) from the reservation access table (183) using the access ID (1802 or 1804) of the record as a key (Step 213) and checks the access kind of the reservation information.

When the access kind of the reservation information (1806) is update, the 1 record update process executes the reservation update posterior process (Step 214). When the access kind is reference, the 1 record update process executes the reservation reference backup process (Step 215). The reservation update posterior process is exactly the same as that explained in Embodiment 3 and the reservation reference backup process is exactly the same as that explained in Embodiment 2.

Next, the 1 record update process confirms the next reservation access time (1807) in the reservation access table (183) (Step 216). When the next reservation access time (1807) is designated, the 1 record update process decides whether the current time passes the next reservation access time or not (Step 217). When the next reservation access time is designated and the current time passes the next reservation access time, the 1 record update process retrieves the reservation access table (183) with the next access ID (1808), gets the reservation information (1806) which is registered next (Step 218), and returns to the check of the access kind.

When the next reservation access time is not registered or the next reservation access time is not over at Step 216 or 217, the 1 record update process exits from the loop of the reservation access process and executes the update process for the record (Step 219).

Figure 22:
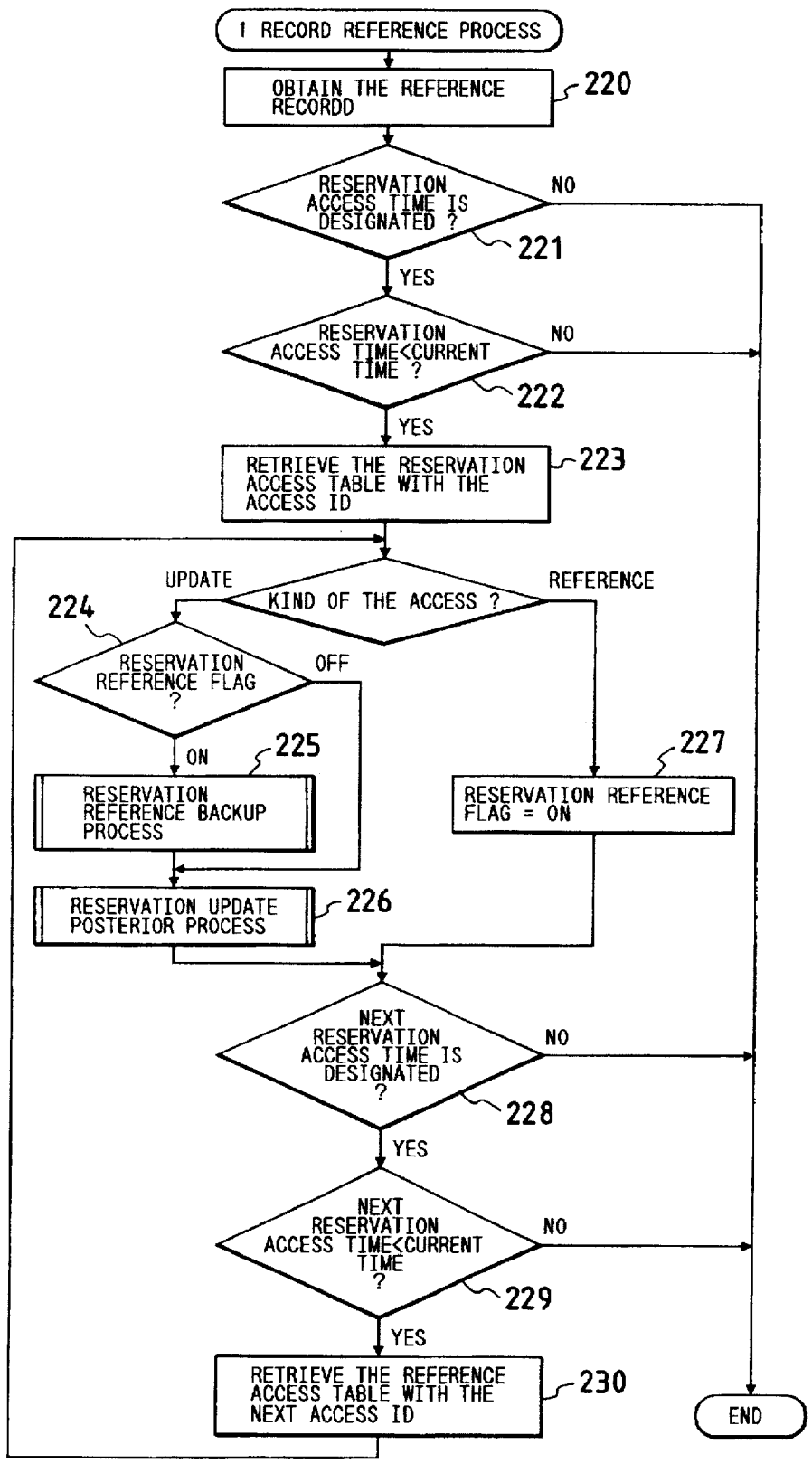
FIG. 22 is a flow chart of the 1 record reference process in the fourth embodiment of the present invention.

FIG. 22 is a drawing showing the flow of the 1 record reference process in this embodiment. The 1 record reference process is a process for referring to the content of a record and called from the reference process of the database.

The 1 record reference process obtains the record to be referred to first (Step 220) and checks the reservation access time (1801 or 1803) of the record (Step 221). When the reservation access time of the record to access is registered, the 1 record reference process decides whether the current time passes the reservation access time of the record or not (Step 222). When the reservation access time of the record to access is not registered or the reservation access time of the record is not over, the 1 record reference process returns the data of the record to the calling source as reference data as it is.

When the reservation access time of the record is registered and the current time passes the reservation access time at Step 221 or 222, the 1 record reference process gets the reservation information (1806) from the reservation access table (183) using the access ID (1802 or 1804) of the record as a key (Step 223) and checks the access kind of the reservation information.

When the access kind of the reservation information (1806) is reference, the 1 record reference process sets the current data to reference data, turns the reservation reference flag on (Step 227), and goes to Step 228.

When the access kind of the reservation information (1806) is update, the 1 record reference process decides whether the reservation reference flag is on or not (Step 224). When the reservation reference flag is on, the 1 record reference process executes the reservation reference backup process (Step 225), executes the reservation update posterior process (Step 226), and then goes to Step 228. When the reservation reference flag is off at Step 224, the 1 record reference process executes only the reservation update posterior process (Step 226). When the 1 record reference process executes the reservation update posterior process, the 1 record reference process sets the updated data to reference data. The reservation update posterior process is exactly the same as that explained in Embodiment 3 and the reservation reference backup process is exactly the same as that explained in Embodiment 2.

Next, the 1 record reference process confirms the next reservation access time (1807) in the reservation access table (183) (Step 228). When the next reservation access time (1807) is designated, the 1 record reference process decides whether the current time passes the next reservation access time or not (Step 229). When the next reservation access time is designated and the current time passes the next reservation access time, the 1 record reference process retrieves the reservation access table (183) with the next access ID (1808), gets the reservation information (1806) which is registered next (Step 230), and returns to the check of the access kind.

When the next reservation access time (1807) is not registered or the next reservation access time is not over at Step 228 or 229, the 1 record reference process exits from the loop of the reservation access process and returns the reference data to the calling source. According to this embodiment, a plurality of reservation accesses can be registered.

According to the present invention, in a database system for executing batch updating and simultaneous reference to a plurality of records, by registering access to the plurality of records for reservation by designating the time beforehand, it is made possible to show an application program as if the update or reference is executed for the records at the same time at the reservation time. According to the present invention, by dividing and executing a registered reservation access process into a reservation access preliminary process which is executed before the reservation time and a reservation access posterior process which is executed after the reservation time, it is made possible to execute batch updating and reference to a large amount of records without stopping the database system.

I claim:

1. A reservation access processing method for a database having a storage device for storing a database table including a plurality of records and a processing apparatus for accessing an optional record in said database table, reserving an updating of said plurality of records and executing said reserved updating at a designated reservation update time, comprising:

a reservation update preliminary process step of storing and registering the designated reservation update time and update content of each record to be updated in said database table for reservation update as reservation update information having a one-to-one correspondence with said record; and a reservation update posterior process step of executing updating according to the update content of the reservation update information corresponding to said record when said record is accessed for the first time after the reservation update time and deleting said reservation update information, wherein when access to a record in said database is requested, said method checks whether there is reservation update information of said record or not and when there is reservation update information corresponding to said record after the reservation update time, said method executes said reservation update posterior process and then accesses said record, and when there is no reservation update information or the reservation update time has not yet occurred, said method does not execute the reserved update but accesses said record.

2. A reservation access processing method for a database according to claim 1, wherein said reservation update posterior process step comprises updating all of said plurality of records which are reserved for updating after said reservation update time.

3. A reservation access processing method for a database according to claim 1, wherein if the current time passes said reservation update time of said reservation update when the reservation update information is being executed at said reservation update preliminary process step, said reservation update process is set to the state of reservation update preliminary process cancelled and the reservation update information of all the records which are registered for reservation update is deleted, and when said reservation update posterior process step is executed, the state of said reservation update process is confirmed, and when said state is reservation update preliminary process cancelled, said reservation update information is discarded.

4. A reservation access processing method for a database according to claim 1, wherein a pointer to a subsequent reservation update information is provided in the reservation update information to be stored in said reservation update information and a plurality of reservation accesses can be registered for a record.

5. A reservation access processing method for a database having a storage device for storing a database table including a plurality of records and a processing apparatus for accessing an optional record in said database table, reserving reference to a plurality of records and executing reference to said plurality of records at a reservation reference time without reserving shared exclusive access right of said plurality of records at the reservation reference time, comprising:

a reservation reference preliminary process step of storing and registering the reservation reference time and reference content of each record to be referred to in said database table for reservation reference as reservation reference information having a one-to-one correspondence with said record;

a reservation reference backup process step which is executed when an update process for said record which is generated after the reservation reference time and reserved for reference is executed and creates backup data for a record which is reserved for reference before an update process for said record is executed; and a reservation reference posterior process step which is started and executed after the reservation reference time and when backup data of said record is created, refers to the backup data and then deletes said backup data and said reservation reference registration and when no backup data exists, directly refers to the content of said record and then deletes said reservation reference registration, wherein when updating of a record in said database is requested, said method checks whether there is reservation reference registration of said record or not and compares the current time with the reservation reference time, and when there is reservation reference registration corresponding to said record and the current time is after the reservation reference time, said method executes said reservation reference backup process, creates backup date of said record, and then executes the update access process for said record, and when there is no reservation reference registration or the current time is before the reservation reference time, said method does not execute the reservation reference backup process but executes the update access process for said record.

6. A reservation access processing method for a database according to claim 5, wherein said reservation reference posterior process step is started with an interruption of a timer or an occurrence of first database access as a turning point at suitable timing after said reservation reference time.

7. A reservation access processing method for a database according to claim 5, wherein if the current time passes said reservation reference time of reservation reference registration when the reservation reference registration is being executed at said reservation reference preliminary process step, said reservation reference process is set to the state of reservation reference preliminary process cancelled and the reservation reference information of all the records which are registered for reservation reference is deleted, and when said reservation reference backup process step and said reservation reference posterior process step are executed, the state of said reservation reference process is confirmed, and when said state is reservation reference preliminary process cancelled, said reservation reference registration is discarded.

8. A reservation access processing method for a database according to claim 5, wherein a pointer to a subsequent reservation reference information is provided in the reservation reference information to be stored in said reservation reference registration and a plurality of reservation accesses can be registered for a record.

9. A reservation access processing method for a database having a storage device for storing a database table including a plurality of records and a processing apparatus for accessing an optional record in said database table, reserving an updating of said plurality of records, executing said reserved updating at a designated reservation update time, reserving reference to said plurality of records and executing said reference to said plurality of records at a reservation reference time without reserving the shared exclusive access right of said plurality of records at the reservation reference time, comprising:

a reservation update preliminary process step of storing and registering the designated reservation update time and update content of each record to be updated in said database table for reservation update as reservation update information having a one-to-one correspondence with said record; and a reservation update posterior process step of executing updating according to the update content of the reservation update information corresponding to said record when said record is accessed for the first time after the reservation update time and deleting said reservation update information, wherein when access to a record in said database is requested, said method checks whether there is reservation update information of said record or not and compares the current time with the reservation update time, and when there is reservation update information corresponding to said record after the reservation update time, said method executes said reservation update posterior process and then accesses said record, and when there is no reservation update registration or the reservation update time has not yet occurred, said method does not execute the reserved update but accesses said record, a reservation reference preliminary process step of storing and registering the reservation reference time and reference content of each record to be referred to in said database table for reservation reference as reservation reference information having a one-to-one correspondence with said record; a reservation reference backup process step which is executed when an update process for said record which is generated after the reservation reference time and before the reservation reference posterior process and reserved for reference is executed and creates backup data for a record which is reserved for reference before an update process for said record is executed; and a reservation reference posterior process step which is started and executed after the reservation reference time and when backup data of said record is created, refers to the backup data and then deletes said backup data and said reservation reference registration and when no backup data exists, directly refers to the content of said record and then deletes said reservation reference registration, wherein when updating of a record in said database is requested, said method checks whether there is reservation reference registration of said record or not and compares the current time with the reservation reference time, and when there is reservation reference registration corresponding to said record and the current time is after the reservation reference time, said method executes said reservation reference backup process, creates backup date of said record, and then executes the updated access process for said record, and when there is no reservation reference registration or the current time is before the reservation reference time, said method does not execute the reservation reference backup process but executes the update access process for said record.

* * * * *